(12) United States Patent
Mawhinney et al.

(10) Patent No.: US 9,703,877 B2
(45) Date of Patent: Jul. 11, 2017

(54) COMPUTER-BASED EVALUATION TOOL FOR SELECTING PERSONALIZED CONTENT FOR USERS

(71) Applicant: LinkedIn Corporation, Mountain View, CA (US)

(72) Inventors: David S. Mawhinney, Pittsburgh, PA (US); Dean Sherwood Thompson, Ligonier, PA (US); Evan S. DiBiase, Pittsburgh, PA (US); Matthew J. Fleckenstein, Pittsburgh, PA (US); Sean J. Ammirati, Pittsburgh, PA (US); Thi T. Avrahami, Pittsburgh, PA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

(21) Appl. No.: 14/921,654

(22) Filed: Oct. 23, 2015

(65) Prior Publication Data

US 2016/0042083 A1 Feb. 11, 2016

Related U.S. Application Data

(63) Continuation of application No. 12/016,752, filed on Jan. 18, 2008, now Pat. No. 9,208,251.

(60) Provisional application No. 60/885,785, filed on Jan. 19, 2007.

(51) Int. Cl.
*G06F 17/30* (2006.01)

(52) U.S. Cl.
CPC .... *G06F 17/30867* (2013.01); *G06F 17/3053* (2013.01); *G06F 17/30554* (2013.01); *G06F 17/30905* (2013.01)

(58) Field of Classification Search
CPC ......... G06F 17/30867; G06F 17/30554; G06F 17/3053; G06F 17/30905
See application file for complete search history.

(56) References Cited

U.S. PATENT DOCUMENTS

| 9,208,251 | B2 | 12/2015 | Mawhinney et al. |
| 2002/0010709 | A1* | 1/2002 | Culbert ............. G06F 17/30876 715/234 |
| 2004/0017997 | A1* | 1/2004 | Cowgill ............... G11B 27/002 386/243 |

(Continued)

OTHER PUBLICATIONS

"U.S. Appl. No. 12/016,752, Advisory Action mailed Mar. 16, 2012", 2 pgs.

(Continued)

*Primary Examiner* — Anil Bhargava
(74) *Attorney, Agent, or Firm* — Schwegman Lundberg & Woessner, P.A.

(57) ABSTRACT

The invention relates to a method and system for selecting personalized content for a user, the method being performed by an evaluation tool instantiated on a computing device and comprising the evaluation tool. The evaluation tool creates a content selection rule for the user for finding and filtering content items, such as advertising content. The tool generates a content selection algorithm from the content selection rule for determining which content items to present to the user and presents the content item to the user based on the content selection algorithm and allows the user to interact with the presented content item.

20 Claims, 14 Drawing Sheets

(56) References Cited

U.S. PATENT DOCUMENTS

| | | | | |
|---|---|---|---|---|
| 2005/0039136 | A1* | 2/2005 | Othmer | G06F 17/30905 715/774 |
| 2005/0160111 | A1* | 7/2005 | Plastina | G06F 17/30035 |
| 2006/0167576 | A1* | 7/2006 | Rosenberg | G06F 17/30032 700/94 |
| 2006/0259867 | A1* | 11/2006 | Watson | G06F 17/30884 715/760 |
| 2007/0132780 | A1* | 6/2007 | Garbow | G06Q 30/02 345/619 |
| 2008/0010584 | A1* | 1/2008 | Corsetti | G06Q 30/02 715/201 |
| 2008/0209320 | A1 | 8/2008 | Mawhinney et al. | |
| 2008/0214148 | A1* | 9/2008 | Ramer | G06F 17/30749 455/414.1 |
| 2011/0213769 | A1* | 9/2011 | Handman | G06F 17/30017 707/722 |

OTHER PUBLICATIONS

"U.S. Appl. No. 12/016,752, Corrected Notice of Allowance mailed Oct. 8, 2015", 14 pgs.

"U.S. Appl. No. 12/016,752, Decision on Pre-Appeal Brief Request mailed May 23, 2013", 2 pgs.

"U.S. Appl. No. 12/016,752, Final Office Action mailed Feb. 4, 2013", 20 pgs.

"U.S. Appl. No. 12/016,752, Final Office Action mailed Nov. 25, 2011", 17 pgs.

"U.S. Appl. No. 12/016,752, Non Final Office Action mailed Mar. 30, 2012", 16 pgs.

"U.S. Appl. No. 12/016,752, Non Final Office Action mailed May 11, 2011", 17 pgs.

"U.S. Appl. No. 12/016,752, Non Final Office Action mailed Aug. 29, 2014", 18 pgs.

"U.S. Appl. No. 12/016,752, Notice of Allowance mailed Sep. 15, 2015", 19 pgs.

"U.S. Appl. No. 12/016,752, Pre-Appeal Brief Request filed May 6, 2013", 5 pgs.

"U.S. Appl. No. 12/016,752, PTO Response to Rule 312 Communication mailed Nov. 9, 2015", 2 pgs.

"U.S. Appl. No. 12/016,752, Response filed Feb. 27, 2012 to Final Office Action mailed Nov. 25, 2011", 12 pgs.

"U.S. Appl. No. 12/016,752, Response filed Aug. 11, 2011 to Non-Final Office Action mailed May 11, 2011", 14 pgs.

"U.S. Appl. No. 12/016,752, Response filed Oct. 1, 2012 to Final Office Action mailed Mar. 30, 2012", 13 pgs.

"U.S. Appl. No. 12/016,752, Response filed Dec. 1, 2014 to Non Final Office Action mailed Aug. 29, 2014", 15 pgs.

"U.S. Appl. No. 12/016,752, 312 Amendment filed Oct. 14, 2015", 11 pgs.

"Discover Rhapsody", http://www.rhapsody.com/playlistcentral, (Dec. 2006).

"Run two mice simultaneously", http://www.winxpfix.com/page26-Sharing-Your-Computer-with-Multiple-Users-Tip.htm#syct, (Dec. 2006).

Lam, Brian, "How To: Build a Media Server", (Feb. 2006), 1 pg.

\* cited by examiner

COMPUTER-BASED EVALUATION TOOL FOR SELECTING PERSONALIZED CONTENT FOR USERS

CROSS-REFERENCE TO RELATED APPLICATIONS

The present application is a Continuation of U.S. Utility patent application Ser. No. 12/016,752, filed on Jan. 18, 2008, which claims the priority benefit of U.S. Provisional Application No. 60/885,785, filed on Jan. 19, 2007, the benefit of priority of each of which is claimed hereby, and each of which is incorporated herein by reference in their entirety.

STATEMENT REGARDING FEDERALLY SPONSORED RESEARCH OR DEVELOPMENT

The present invention was not developed with the use of any Federal Funds, but was developed independently by the inventors.

FIELD OF THE INVENTION

The invention relates to a computer-based evaluation tool for selecting personalized content for users, and more particularly relates to such a tool that is capable of learning rule sets for personalized search and filtering.

BACKGROUND OF THE INVENTION

The intense competition between online publishers to acquire new customers and retain existing ones, coupled with a renewed interest in online advertising, has focused industry attention on the personalization of content and advertising. The goal of such personalization is to tailor the selection of online content and advertising to the interests of a particular user or group of users.

Content personalization is an application in the field of "adaptive computation": the creation of computer programs that improve over time based on experience. Personalized content delivery is preferably adaptive because editors cannot hand-select content for each individual or small group, and because few consumers are willing to invest sufficient effort up front to thoroughly manually customize their own content. However, every user wants to be empowered to occasionally exert at least some control, and a small minority wants a lot of control. An effective content personalization solution should gracefully combine adaptive computation with an ability for users to directly see and modify the rules that are being used to select content for the, when they so choose.

Content personalization is difficult because each individual user has a unique set of reasons for preferring one content item over another. To accommodate each individual user's content preferences, a computer program should be able to encompass a wide range of varied rules for selecting content, such as a content item's source or author, the topics that it covers, its style of writing, the content item's popularity among other users, and the like. These varied rules for selecting content must be combined in a flexible way that gives each individual user or group a personal algorithm for delivering content.

In recent years, a wide variety of technical approaches to this problem have been taken. These approaches have ranged from traditional collaborative filtering (such as the product recommendations on Amazon.com) to adaptive computation techniques such as neural nets and genetic algorithms. However, none of these personalization efforts have succeeded in effectively blending the necessary ingredients: adaptive computation, empowering the user to see and modify the rules, and encompassing a wide range of varied rules into a personal algorithm for each user or group.

The present invention overcomes these limitations and deficiencies in the prior art by providing methods and systems for learning rule sets for personalized search and filtering as described herein.

SUMMARY OF THE INVENTION

The aforementioned needs are satisfied at least in part by a method and system for selecting personalized content for users. The method is performed by an evaluation tool that is instantiated on a computing device.

The invention relates to a method and system for selecting personalized content for a user, the method being performed by an evaluation tool instantiated on a computing device and comprising the evaluation tool. The evaluation tool creates a content selection rule for the user for finding and filtering content items, such as advertising content. It generates a content selection algorithm from the content selection rule for determining which content items to present to the user and presents the content item to the user based on the content selection algorithm and allows the user to interact with the presented content item. The tool also monitors the user's interaction with the presented content item for determining a modification of the content selection algorithm based on the user's interaction and presents the content item to the user based on the modified selection algorithm. The tool also enables the user to view and modify the selection rule and the content selection algorithm.

In one embodiment of the invention the user is part of a group of users, the content selection rule is created for the group, the content selection algorithm is generated for the group, and the interaction of the group with respect to the presented content item is monitored for determining the modification of the content selection algorithm based on the group's interaction. In one form of the invention, the content selection algorithm of at least one of the users is influenced by the content selection algorithm of the group.

In another form of the invention the content selection algorithm generating step includes learning new selection rules that should be added to the algorithm, determining selection rules that should be removed, or adjusting parameters that influence how the selection rules are combined into the algorithm.

In another form of the invention, a weight is assigned to the at least one selection rule and the content generating step is performed by utilizing the weight. In another form, a plurality of content selection algorithms are generated in the algorithm generating step for each user. In another form, the evaluation tool comprises the step of generating queries based on the content selection algorithm to search for content items.

In another form of the invention, the algorithm generating step comprises selecting the content items from a preselected stream of candidate items. In yet another form, the view and modify step includes that the user is able to explicitly indicate a preference or a lack of a preference for a content item. In another form the user is able to indicate a motivation for the preference or lack of a preference.

The tool may also include the step of adjusting the content selection rules using an optimization technique. In addition, the tool may include the step of adjusting the selection rule by referencing selection rules of other users. The tool may also include the step of permitting the user to publicize and promote the content selection algorithm. Also, the tool may include the step of aggregating the content selection algorithms of the user and the group whereby describing the overall content preferences of the user and the group.

BRIEF DESCRIPTION OF THE DRAWINGS

The foregoing summary, as well as the following detailed description of various embodiments of the present invention, will be better understood when read in conjunction with the appended drawings. For the purpose of illustrating the embodiments, there are shown in the drawings embodiments which are presently preferred. As should be understood, however, the embodiments of the present invention are not limited to the precise arrangements and instrumentalities shown. In the drawings.

DETAILED DESCRIPTION OF THE PREFERRED EMBODIMENTS

Figure 14:
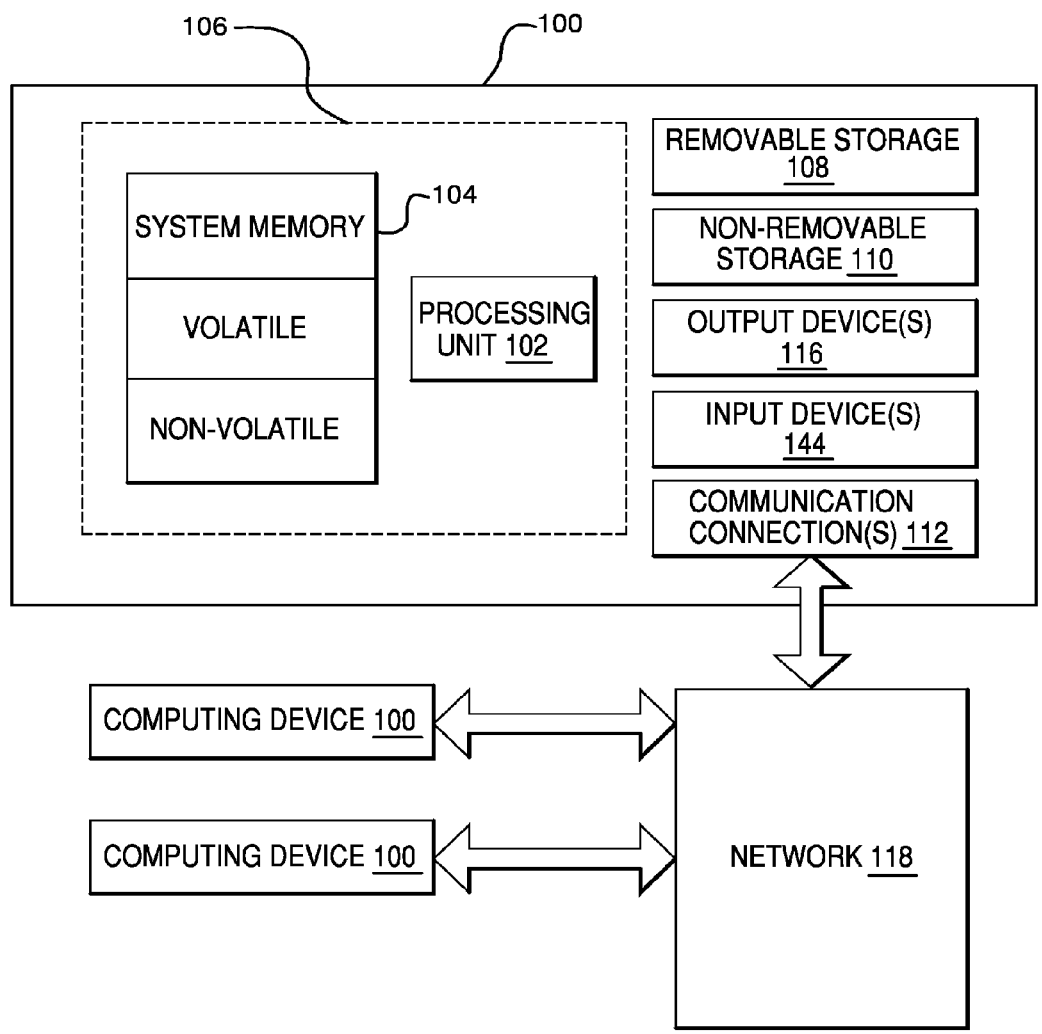
FIG. 14 is a block diagram of an example of a computing environment within which various embodiments of the present invention may be implemented.

FIG. 14 is set forth herein as an exemplary computing environment in which various embodiments of the present invention may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, and the like that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 14 an exemplary system for implementing aspects described herein includes a computing device, such as a computing device 100. In its most basic configuration, the computing device 100 typically includes at least one processing unit 102 and a memory 104. Depending on the exact configuration and type of the computing device, the memory 104 may be volatile (such as random access memory (RAM)), non-volatile (such as read-only memory (ROM), flash memory, and the like), or some combination of the two. This most basic configuration is illustrated in FIG. 14 by dashed line 106. The computing device 100 may have additional features/functionality. For example, the computing device 100 may include additional storage (removable and/or non-removable) including, but not limited to, magnetic or optical disks or tape. Such additional storage is illustrated in FIG. 14 by removable storage 108 and non-removable storage 110.

The computing device 100 typically includes or is provided with a variety of computer-readable media. The computer readable media can be any available media that can be accessed by the computing device 100 and includes both volatile and non-volatile media, removable and non-removable media. By way of example, and not limitation, the computer readable media may comprise computer storage media and communication media.

The computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 100. Any such computer storage media may be part of computing device 100.

The computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

The computing device 100 may also include input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, the computing device 100 may be one of a plurality of computing devices 100 inter-connected by a network 118, as is shown in FIG. 14. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CDROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

In FIGS. 1 through 13 there is shown various preferred embodiments of a tool 10 for generating search and filtering algorithms for individual users, and for groups of users sharing similar interests in accordance with the present invention.

In one form of the invention, the tool 10 combines individual content selection rules called "memes" into complete algorithms, called "meme sets," for finding and filtering content for one or more users and groups of users. Memes are selection rules which are used for finding and filtering all kinds of electronic content, such as textual articles, RSS feeds, Atom feeds, video, audio, and the like.

The personalized content that is found and filtered by meme sets may be presented to the user in any suitable medium, including online media such as a standalone web site, a personalized web page on another web site, a content area embedded in the page of another web site, an RSS feed, an Atom feed, a podcast, email, online video and/or audio, and the like.

Figure 8:
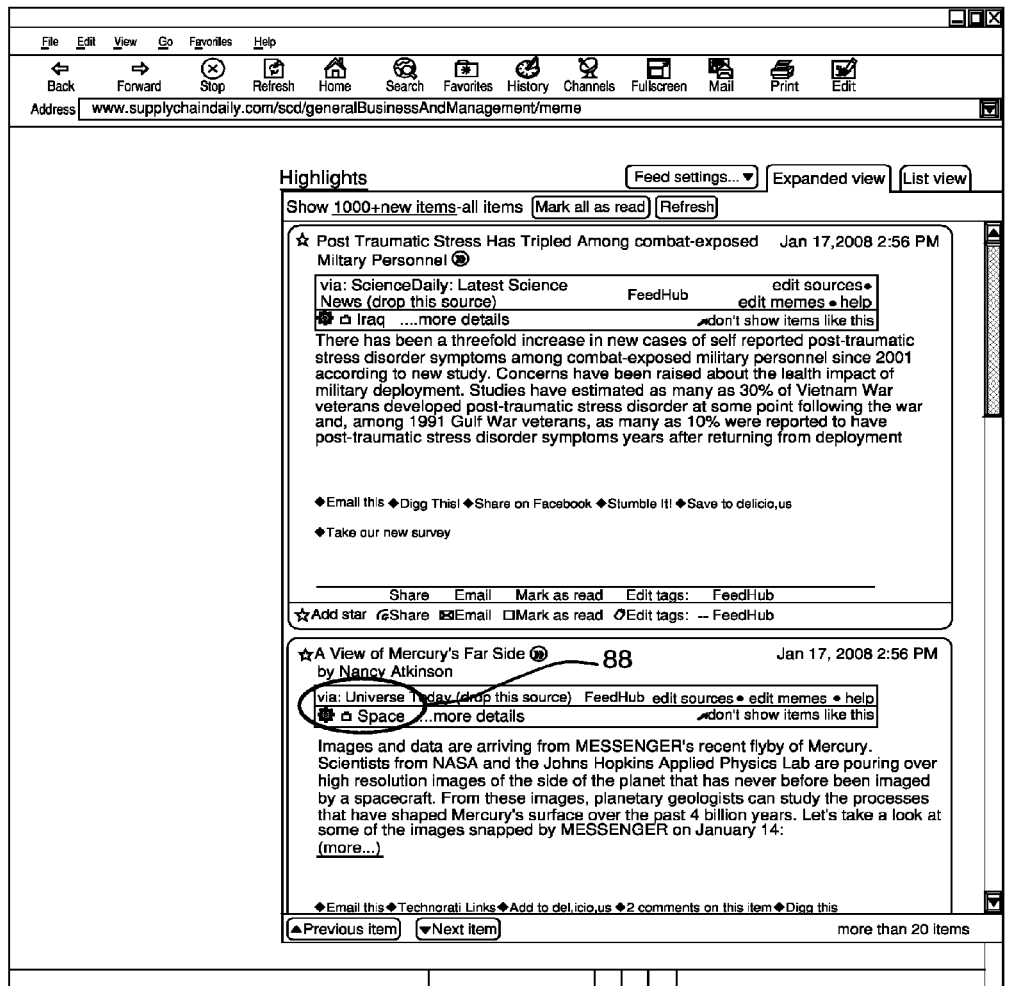
FIG. 8 is a screenshot displayed by the tool of FIG. 1 showing personalized content presented in an RSS feed in accordance with various embodiments of the present invention.

Referring now to FIG. 8, a screenshot is shown that depicts personalized content being presented to a user in an RSS feed reader 86, such as the GOOGLE Reader shown. In the screen shot, a meme is represented by the term "space" and the folder icon 88.

Figure 9:
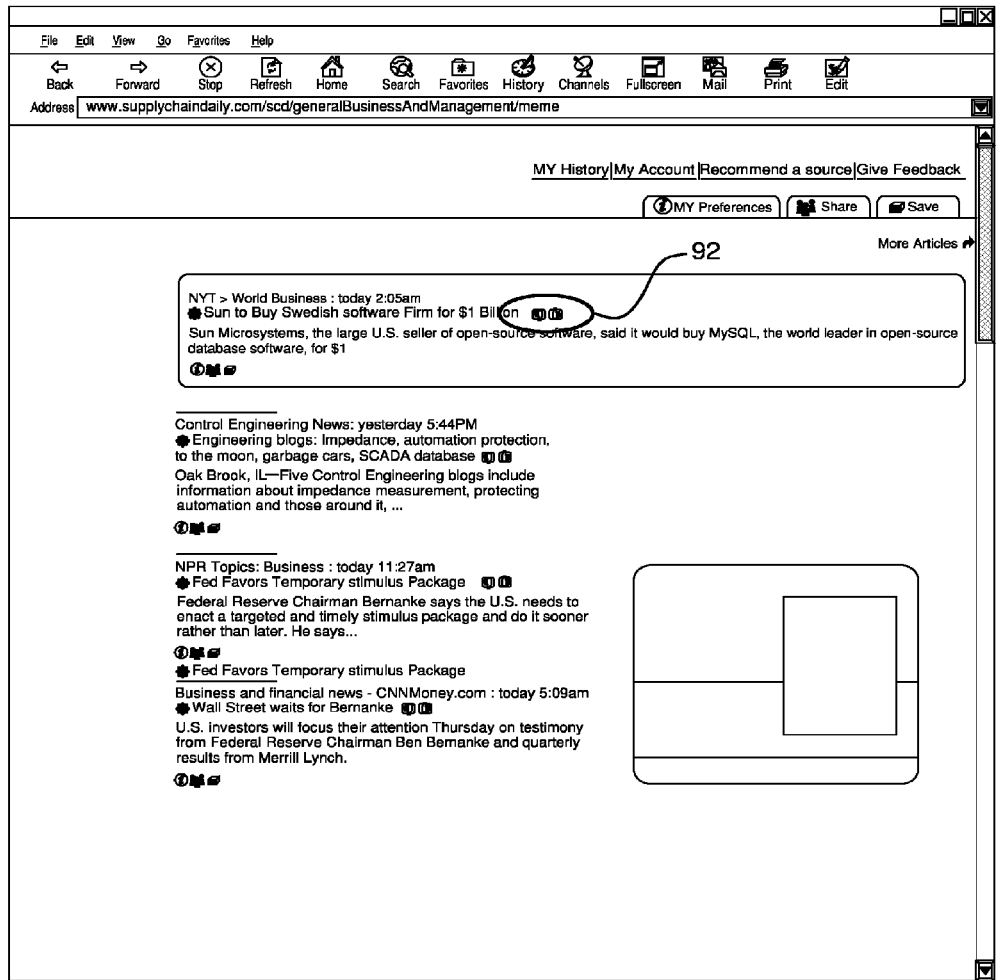
FIG. 9 is a screenshot displayed by the tool of FIG. 1 showing personalized content presented in a browser in accordance with various embodiments of the present invention.
Figure 10:
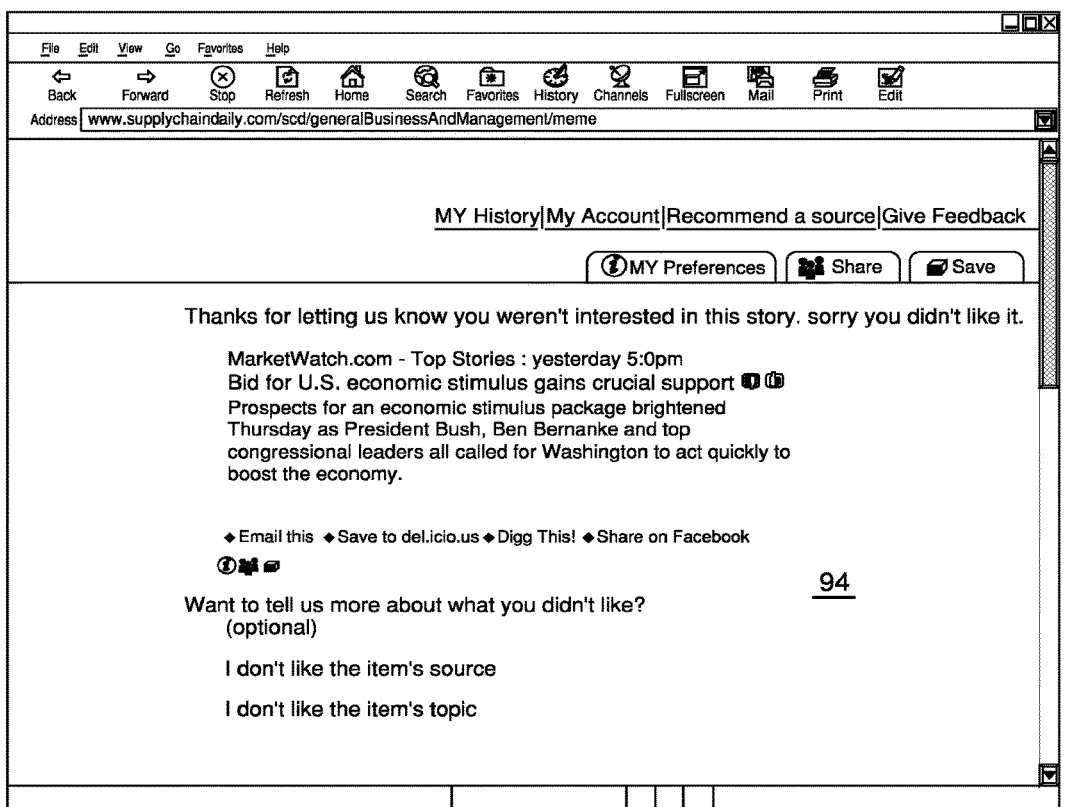
FIG. 10 is a screenshot displayed by the tool of FIG. 1 showing a user interface for providing feedback in accordance with various embodiments of the present invention.

Referring now to FIG. 9, a screenshot that depicts personalized content being presented to a user in an internet browser 90, such as MOZILLA firefox shown.

Meme sets may also be used to find and filter the most effective advertising for an individual or a group, in which case the personalized advertising content may be presented in any online medium, such as those described above, including on a stand-alone web site, on a personalized page on another web site, in conjunction with a content area embedded in the page of another web site, as a separate item in an RSS or Atom feed, embedded in an item in an RSS or Atom feed, or the like.

A meme set may also be used to choose personalized advertising for use on a web site or in any other online context where the user can be identified or remains anonymously, or where membership in an "interest group," as described in greater detail below, can be determined or inferred. In addition, a meme set may be used as an algorithm for automatically bidding on advertising space when a user or a member of an interest group goes to a web site or otherwise consumes online media.

The term "meme" was coined by Richard Dawkins in his 1976 book *The Selfish Gene* to represent a contagious idea. For example, the notion of a cup has been passed down through the ages from culture to culture. Today's polystyrene cup might look strange to an ancient Egyptian, but the ancient Egyption would likely still understand that the polystyrene cup embodied the notion of cup as he understood it.

As used in this specification, the term "meme" is defined as a rule pertaining to which content to present to a user or group of users. More specifically, a meme is defined as a Boolean predicate on a content item such as an article, a blog entry, a video, a podcast recording, or the like. A particular meme either matches or does not match a particular content item, when evaluated against that content item in a particular context. The context may include such factors as which user is viewing the item, when the user is viewing the items, what other items the user has viewed and when, what other items are being presented on the same page for viewing, and the like.

Optionally, a meme can include one or more "motivations." Motivations indicate the kinds of assessments of the content item that are made by a meme.

The method 10 supports motivations, such as the following:

A "topic" motivation is used by memes that look at indications of the topic of the content item, such as phrases, keywords, and editorial classifications.

The "source" motivation is used by memes that look at the source or type of source of the content item.

The "social" motivation is used by memes that look at how others in the social network responded to the item.

The "history" motivation is used by memes that evaluate a content item in light of the user's own reading history.

For example, the tool 10 of the present invention can use the following examples of different types of memes. It is contemplated that the meme is parameterized, so that a particular instance of that meme can have specific behavior.

A "content tag recognizer meme" matches content items that contain or match a particular "tag," as described in greater detail below. This meme takes its motivations from the tag.

A "broad time of day meme" matches content items if they are presented during a certain time period in the day, such as if they are presented in the morning or presented in the afternoon. This meme has no specific motivation.

A "both content tags meme" matches content items that contain or match two specific tags. It should be understood that this idea can be extended to arbitrary Boolean combinations of tags. This meme takes its motivations from the tags.

A "hot topics meme" matches content items that contain keywords that are defined as "hot" within some particular time period, such as on a particular day. A topic may be "hot" if it is mentioned in many content items, mentioned by content items from many different sources, mentioned in content items that are read by many users, and the like. This meme's motivation is "topic."

A "my friends liked it meme" matches content items that were responded to in a particular way by the user's direct contacts in a social network. For example, a particular instance of this meme may match content items that at least two of the user's friends chose to read, or that at least three of the user's friends explicitly gave positive feedback (such as a "thumbs up" designator), or that at least one of the user's friends explicitly gave negative feedback (such as a "thumbs down" designator). This meme's motivation is "social."

A "not from feed with property values meme" matches content items that are not from raw sources that have been editorially classified in a certain way, such as, for example, a RSS feed. This is an example of a meme that is intended to be used to exclude content items. For example, an instance of this meme might exclude content items that are not about sports if the user has indicated that their interest is sports. This meme's motivation is "source."

A "sent to meme meme" matches content items that have been explicitly sent or forwarded to the user by other users in the system. This meme's motivation is "social."

A "similar items matching tag meme" matches content items that contain or match a specific tag, and that are similar to other content items matching the same tag that the user has responded to in a particular way. For example, an instance of this meme might match content items that contain the keyword basketball, and that are similar to other items containing the keyword basketball that this user has given a "thumbs up" designator. It should be understood that similarity can be measured in many different ways, such as similarity of the item text or a percentage overlap of the tags contained in two content items. This meme's motivation is "history."

A "similar items meme" matches content items that are similar to other items presented to the user during a particular time frame, such as during the past several minutes, the past eight hours, or the past three days. This meme's motivation is "history."

It should be understood that the above examples are merely exemplary and that many additional examples are contemplated by and fall within the scope of the present invention, and are known to those skilled in the art.

The tool 10 of the present invention provides an interface to meme. In one preferred embodiment of the present invention, the primary interface to a meme is declared in a Java implementation of the tool 10 as follows:

```
public List<ContentTag> match(ContentItem item,
   ItemMatchingContext context)
```

If the meme matches the specified content item in the specified context, it returns a list of the specific tags, as described in greater detail below, that caused it to match the item. If the meme does not match the item, it returns a null.

An additional interface may be defined in the preferred Java implementation to allow some memes to generate queries that will find content items matched by the meme:

```
public interface TagQueryGenerator
{
    /**
     * Returns a {@link TagQuery}, or <code>null</code> if no
query can be generated.
     */
    TagQuery getQuery( );
}
```

In the tool 10, the term "tag" or "content tag" is defined as a Boolean predicate on a content item that is considered to be simpler or more primitive than a meme, and that can be used as a parameter to or component of a meme. Similar to memes, content and tags are parameterized so that each instance of a tag has a specific meaning.

In an alternate preferred embodiment, a tag can have one or more motivations which indicate the aspects of the content item that are characterized by the tag. In the tool 10, tags can have the same motivations as described above for memes.

For example, the tool 10 of the present invention can use the following examples of content tags:

A "keyword tag" indicates that the content item contains a particular keyword. The keywords on a content item may be specified by the source of the content item, such as by the publisher who generated the content item, may be assigned by an editor, or may be assigned by an algorithm that analyzes the item's text. The motivation for this tag is "topic."

An "author tag" identifies the author of the content item. The motivation for this tag is "source."

A "category tag" identifies a content category that the item has been placed in, whether by the original author, the publisher, or an algorithm. The motivation for this tag is "topic."

A "channel link domain tag" is designed for use with content items that come from, for example, RSS (or equivalently Atom) feeds, which have a link called a "channel link" back to the website that was the source of the content item. This tag represents the Internet domain of that website, such as "npr.org" or simply ".org." The motivation for this tag is "source."

A "feed property tag" indicates that the content item came from a feed which is classified as having a particular property. The property may be assigned to the feed by an editor, by the publisher of the feed, or by an algorithm. The motivation for this tag is "source."

A "source tag" identifies the source of the content item, such as the particular RSS feed from which it came. The motivation for this tag is "source."

A "taxonomy name tag" indicates a taxonomy node within which the content item has been filed. A content item may be placed in a taxonomy node by its publisher, by an editorial staff, or by an algorithm. The motivation for this tag is "topic".

A "recent item tag" matches content items that were published or processed within a particular recent timeframe, such as within the past four hours or the past three months. This tag has no specific motivation.

A "short item tag" matches items whose textual content is shorter than a certain limit, such as 1072 characters. This tag has no specific motivation.

A "friend feedback tag" matches items that have been responded to in a particular way by direct contacts of the user in the social network. Note that this is an example of a content tag that is a very context-dependent predicate on the content item, instead of just a static fact about the content item. The motivation for this tag is "social."

An "old item tag" matches items whose publication or processing date is older than a particular time frame, such as older than the past four hours or older than the past three months. This is an example of a tag that is more likely to be used for recognizing items that a user won't like than for recognizing items that the user will like. This tag has no particular motivation.

A "search phrases tag" matches items whose textual content matches one or more search phrases. The motivation for this tag is "topic."

It should be understood that the above examples are merely exemplary and that many additional examples are contemplated by and fall within the scope of the present invention, and are known to those skilled in the art.

The tool 10 of the present invention provides an interface to content tags. In one preferred embodiment of the present invention, the primary interface to a content tag is defined in a Java implementation of the tool 10 as follows:

```
public boolean matches(ContentItem item,
    ItemMatchingContext context)
```

An additional subclass is defined in the preferred Java implementation to allow some content tags to generate queries that will find content items matched by the content tag:

```
public class SearchableTag extends ContentTag {
    public Query generateLuceneQuery( ) {
        return null;
    }
}
```

Having defined the more important terms used throughout this specification, the tool 10 can now be described in greater detail. As best seen in the block diagram of FIG. 1, the tool 10 of the present invention may be implemented in, for example a website or an application. For purposes of this application the tool 10 will be described in a website implementation.

When a new user 12 visits a website (or uses an application) utilizing the tool 10, that user 12 is initially associated with zero or more interest groups, as shown in subsystem 14. This initial association between the user and the interest groups may be based on any knowledge that the tool 10 may possess or can obtain about the user and the user's goals. For example, the tool 10 typically has knowledge with respect to how the user arrived at the site, such as by the search term in a "referrer header" from a search engine such as GOOGLE, or the URL that the user used to reach the site, information that is ascertained about the user's client program, or the user's IP address, an existing "cookie" already stored for that user, and information that the user has previously provided when setting up an application, their browser, or one or more websites.

The following are some examples of possible rules for associating users with interest groups, as contemplated by the present invention:

When a user arrives from a search engine, such as GOOGLE, the HTTP request contains a "referrer header" that shows the search term entered by the user. All users who arrive through the same search term may be associated with an interest group. Also, search terms can be placed into categories either editorially or using an algorithm and all users who arrive through a search term in the same category can be associated with an interest group.

A user's geographic location can be inferred from the user's IP address, and all users in the same geographic location can be associated with an interest group.

When the user registers on a website they can be asked to list their interests, and then associated with an interest group for each of the interests that they listed.

It should be understood that the above examples are merely exemplary and that many additional examples are contemplated by and fall within the scope of the present invention, and are known to those skilled in the art.

After the initial association with potential interest groups, it may be desired to acquire additional information from the user, such additional information with respect to the user's content preferences, such as shown in subsystem 16, and described in greater detail below. Alternately, the user may be presented with content based on the interest groups with whom the user may have been initially associated by the system as shown in subsystem 20.

Figure 7:
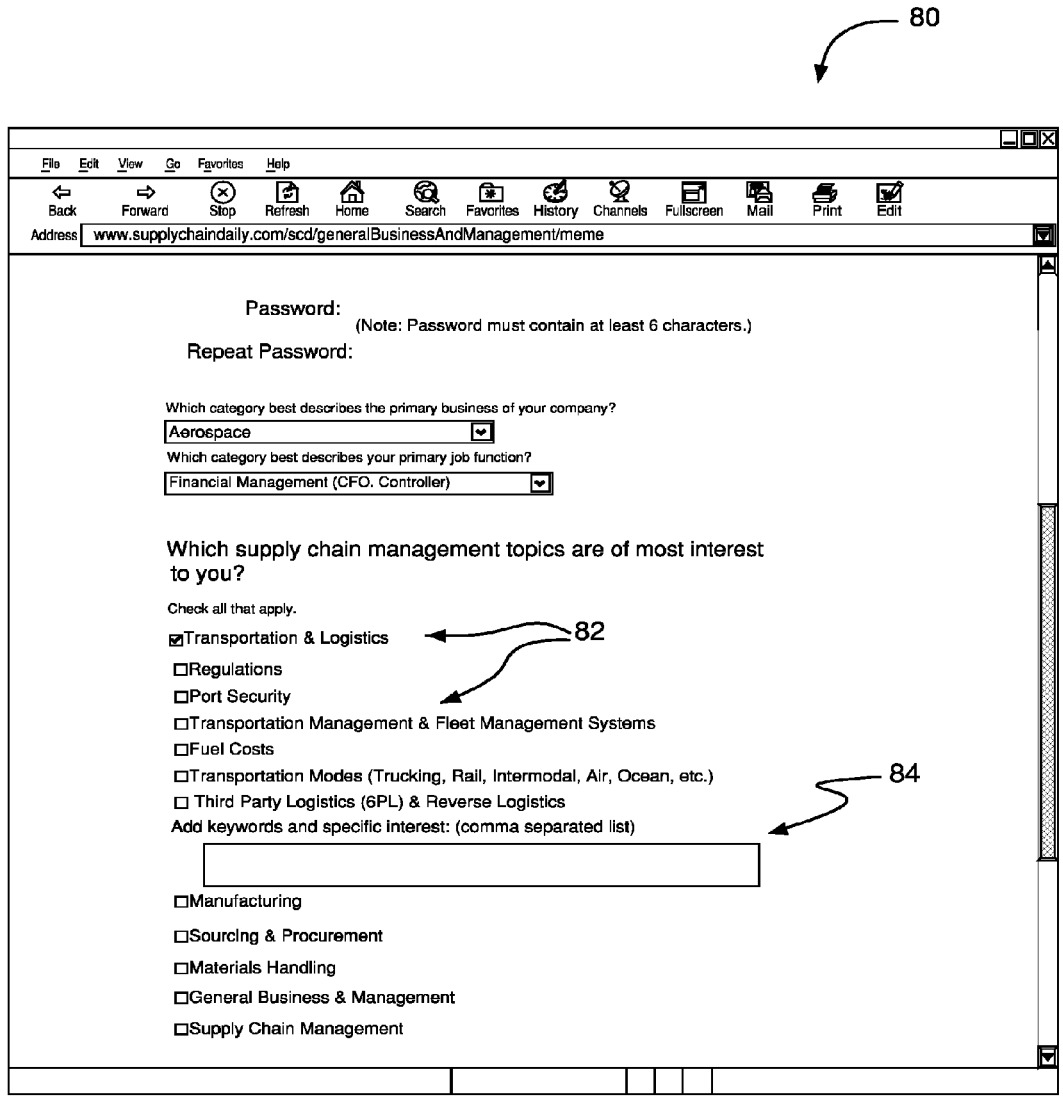
FIG. 7 is a block diagram of a questionnaire used in the tool of FIG. 1 to ascertain user content preferences.

In accordance with subsystem 20, a new user or an existing user who wishes to receive content on a new subject may be presented with a questionnaire 80, such as the questionnaire shown in FIG. 7, which allows the user to specify his preferences with respect to the content he wishes to receive. In the questionnaire 80, the checkboxes 82 may represent interests that were predefined or preselected by an editor or that were defined implicitly or explicitly by the activity of other users.

Referring back to FIG. 1, for each interest that the user selects, the user is assigned, preferably automatically, a set of memes associated with that interest as shown in subsystem 22. These memes may be predefined or preselected, or may be generated implicitly or explicitly by the activity of other users as described above and below.

Referring back to FIG. 7, the questionnaire 80 may also allow the user to specify a list of interests by entering text into text entry box 84. This text may be used to search for interests possessed by the tool 10, may be converted into "search phrase memes," or may be converted into "keyword memes" as described in greater detail above.

Referring back now to FIG. 1, memes may also be generated in subsystem 22 from any knowledge that the system possesses or can obtain about the user and the user's goals, including how the user arrived at the site, such as the search term in a "referrer header" from a search engine, such as GOOGLE, or the URL that the user visited, information that is ascertained about the user's client program, or the user's IP address, a "cookie" already stored for that user, or information that the user has previously provided when setting up an application, their browser, or one or more websites.

For example, if the user's geographic location can be inferred from their IP address, then memes may automatically be generated for that user in subsystem 22 to match content associated with or appropriate for that geographic location.

Preferably, each meme in a meme set is assigned a weight in subsystem 24. The weight may be positive or negative. The meme's weight also determines that meme's contribution to finding and filtering content as described in connection with subsystem 28 described in greater detail below. A positive weight indicates that content matched by the meme is desirable. A negative weight indicates that the content is undesirable. The overall desirability of a particular content item may be determined by adding together the weights of all of the memes in a particular meme set that match that content item as shown in subsystem 26. This total weight is called the item's "score," and is best understood as a forecast of whether the user will like the content item. It should be understood that other suitable methods of determining the overall desirability are contemplated by the present invention and are known to those skilled in the art.

Preferably, the weights assigned to memes in subsystem 24 and the scores calculated in subsystem 26 for content items are measured in units called "centiclicks." A centiclick score for a content item represents a forecast of the percent likelihood that the user will like that item well enough to click through on its hyperlinked title or short summary and read the item. For example, if the total weight of all memes in a particular meme set matching a particular content item is 25 centiclicks, then according to that meme set there is approximately a 25% chance that the user will like that content item well enough to read it based on a title and short summary.

Figure 1:
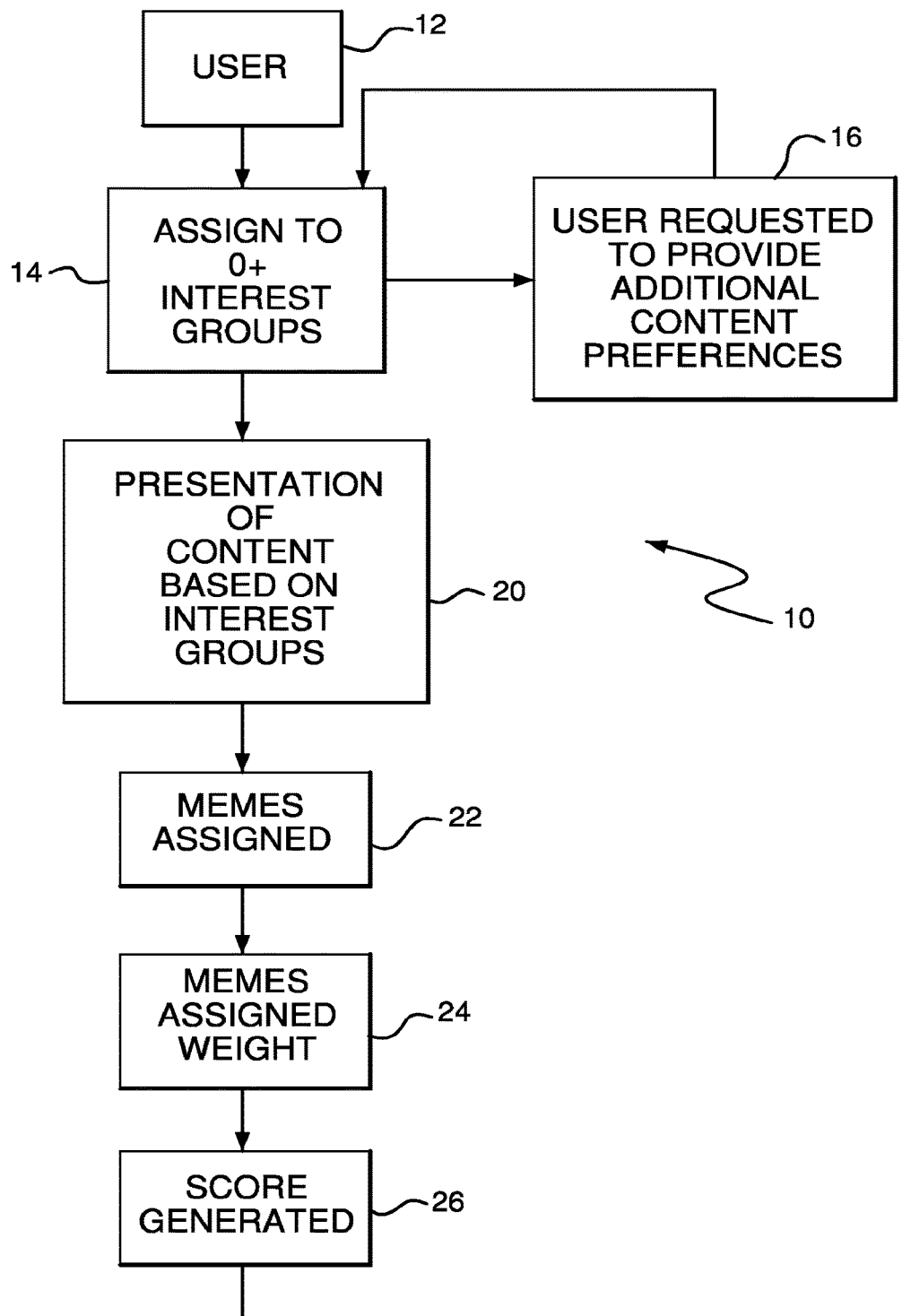
FIG. 1 is a block diagram of an evaluation tool instantiated on a computing device showing some of the steps of the method and system in accordance with various embodiments of the present invention.
Figure 2:
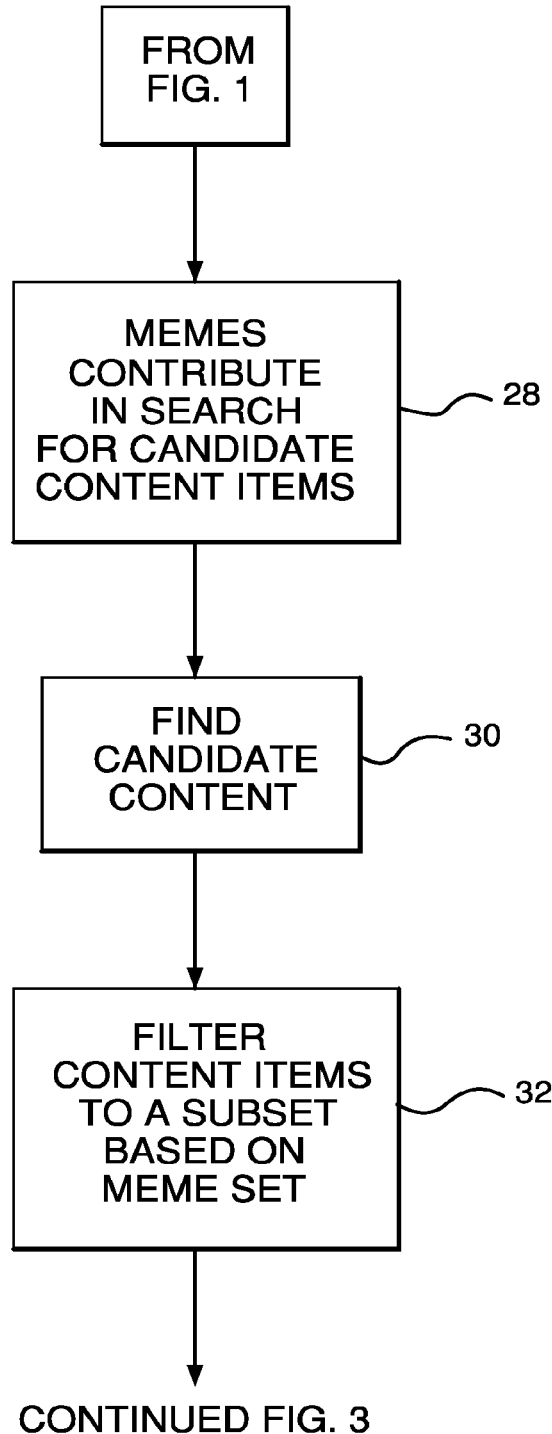
FIG. 2 is a block diagram of additional steps of the tool of FIG. 1.

Referring now to FIG. 2, in addition to evaluating content items, some memes are able to contribute in a search for content items as shown in subsystem 28. For example, the tool 10 may accomplish this by using memes to generate search terms that will be combined to perform a search in a reverse index such as Lucene, or by using some other algorithm that is implemented to search for content items that are matched by the memes.

In a preferred Java implementation of the invention, the declaration of a meme class indicates that the meme can generate search terms by declaring that the meme class implements an interface called TagQueryGenerator, as described above.

One exemplary method for finding content given a particular meme is set forth below:

- A subset of the memes from the meme set is chosen to participate in the search. For example, only positively weighted memes may be chosen to participate. (If performance considerations allow all of the positively weighted memes in the meme set to participate in the search, then that may be acceptable as well.) Alternatively, only the most strongly weighted n memes may be used, or, to improve the variety of content that is returned, a randomly selected subset of the positively weighted memes may be used.
- Each participating meme is inspected to see if it is able to generate a search term. If so, the meme's search term is obtained and added to a list of terms that will be used for the search. If the meme is not able to generate a search term, the meme is inspected to see if it is able to do a search itself. If so, the meme is queried for its list of candidate content items which are appended to the overall list of candidate content items.
- The search terms are combined to generate by the memes into one query. For example, if the search term generated by one meme is "baseball," and the search term generated by another meme is "batting average," then the overall query would be "baseball AND 'batting average.'"
- If the search engine being used permits individual terms of the query to be assigned weights, then each term may be given the weight of the meme that generated it. To continue with the above example, if the weight of the meme that generated the term "baseball" is 20 and the weight of the meme that generated "batting average" is 10, then the overall query might be expressed as "baseball/20 AND 'batting average'/10."
- If the search engine being used has an option to use the term weights directly, instead of re-weighting them based on its own analysis of which search terms are most important, it is desirable to have it use the term weights directly. (Many search engines, including the Lucene search engine (see http://lucene.apache.org/) which is preferably used by the Java implementation of the present invention, uses the commonly known "TF IDF," i.e., Term Frequency Inverse Document Frequency, algorithm by default to drive its own weighting of search terms.)
- The system then loads as many of the search results as time and resources allow. These search results are appended to the overall list of candidate content items.

Given a particular meme set, the above process generates a list of candidate content items that have been found by the system using the memes a shown in subsystem 30, and that might be desirable content to present to the user. However, for several reasons, this may not yet be the best content to present to the user because, for example:

- As described above, in some cases only a subset of the positive memes are used for the search.
- The negative memes had not yet had a chance to influence the choice of content.
- Depending on the search engine being used, the meme weights may not be precisely reflected in the ranking of the content as returned by the search.

To address these issues, in one preferred form of the present invention, a meme set may be used to filter the content that came back from the search as shown in subsystem 32. To accomplish this, the memes in the meme set are applied directly to each content item in the list of candidate content items to re-order that list and decide exactly which content will be returned to the user. This is done as follows:

First, each candidate content item is scored by all of the memes in the meme set. The score is the sum of the weights of the memes that match that content item.

Next, the list of candidate items is sorted by descending score.

Finally, as many content items as are needed for presentation to the user are taken from the top of the list. The remaining content items may be cached in case the user wants them later (such as if the user chooses to view an additional page of content on a website), or may simply be discarded.

Figure 6:
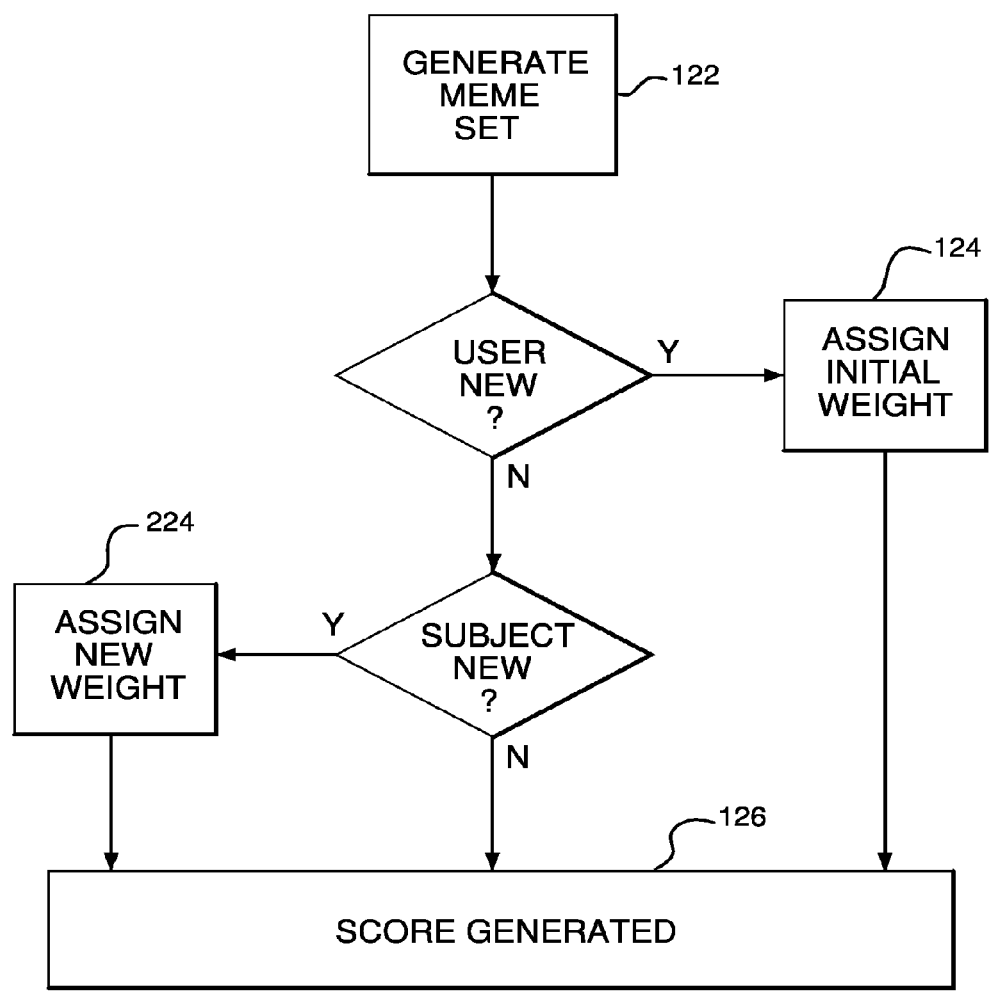
FIG. 6 is a flow chart of steps pertaining to establishing or modifying meme weights of the tool of FIG. 1.

Turning now to FIG. 6 where like reference numerals refer to similar structure, when a meme set is created for a new user as in subsystem 122, or when a new meme set is created to obtain content on a new subject by an existing user as in subsystem 124, each meme is assigned an "initial weight." The goal is for the initial weight for each meme to reflect the increase, or, if negative, decrease, in likelihood that the user will like a content item if the meme matches the content item. Thereafter, this initial weight is used to calculate a score as in subsystem 126.

As explained above, in a preferred Java implementation of the present invention, the system measures meme weights and content item scores in "centiclicks," which represent an estimated percent likelihood that the user will like a content item well enough to click on it. This means that, for example, if the fact that a meme matches a content item indicates an additional 10% chance that the user will like the content item well enough to click on it, then the meme should be assigned a weight of 10. This is a fairly strong meme, since it is uncommon for a single fact about a content item to indicate as much as an additional 10% chance that the user will like it. To give another example, a weight of 50 for a meme is extremely rare, because it indicates that the mere fact that a content item matches that meme predicts an additional 50% likelihood that the user will like the content item. Going in the other direction, a weight of 1 indicates a meme that is not very strong, because it indicates that content items matching that meme will only have an additional 1% likelihood that the user will like them, compared to content items not matching that meme. The same type of reasoning can be used to understand the meaning of negative meme weights, bearing in mind that these memes represent a decreased likelihood that the user will like a content item matching the meme.

The initial weights can be assigned in several different ways:

As described above, the user (or one of the user's meme sets) may be associated with one or more interest groups. As will be described in greater detail below, an interest group may have its own meme set, with the memes and meme weights determined by the aggregate behavior of members of the interest group. In this case, the memes and initial meme weights for the new meme set may be copied from the interest group's meme set.

As described above, the user may be given an opportunity to select from interests that were predefined or preselected by an editor. In this case, the initial meme weights may also be predefined or preselected.

As also described above, the user may be given an opportunity to enter terms or text representing their interests. These terms may be used to find predefined or preselected interests or interest groups that should be associated with the new meme set, in which case the initial meme weights are established as explained above. Alternatively, these phrases may be used directly to generate memes, such as keyword memes and search phrase memes. In this case, the algorithm that generates the memes should give them predefined or preselected weights. Since these memes come directly from explicit user preferences, weights of these memes should be relatively high positive numbers. Keyword memes are generally more reliable, because keywords are assigned either by human editors or by sophisticated algorithm. In this way, for example, the preferred Java implementation of the present invention uses a weight of 7 for these memes. It should be understood that other suitable weights may be used alternatively. Search phrase memes are less reliable, because they match the phrase wherever it occurs in the document, even if it is not very important to the document. So, for example, the preferred Java implementation of the present invention uses a weight of 1 for these memes.

In one preferred form of the present invention, the tool 10 comprises creating an initial meme set for a new user or a new subject, using this meme set, including its constituent memes and meme weights, to find and filter content for a user, and presenting the filtered content to the user. This is typically sufficient for many applications that present desired content to a user.

For other applications, however, it may be desirable to have the capacity to change the meme set over time by, for example adding memes, removing memes, and/or changing meme weights, to reflect, for example, the improved understanding of the user's content preferences that can come from monitoring and analyzing the user's history of interaction with the system. This capability is referred to as "feedback history."

Although it is sometimes easiest, in terms of simplicity, to describe the recording and use of feedback history as though it represented all of the feedback from a particular user, in practice it is usually better to allow a user to have multiple meme sets, such as for different subject areas, to associate feedback with a particular meme set, and to analyze only the feedback for a particular meme set.

Figure 3:
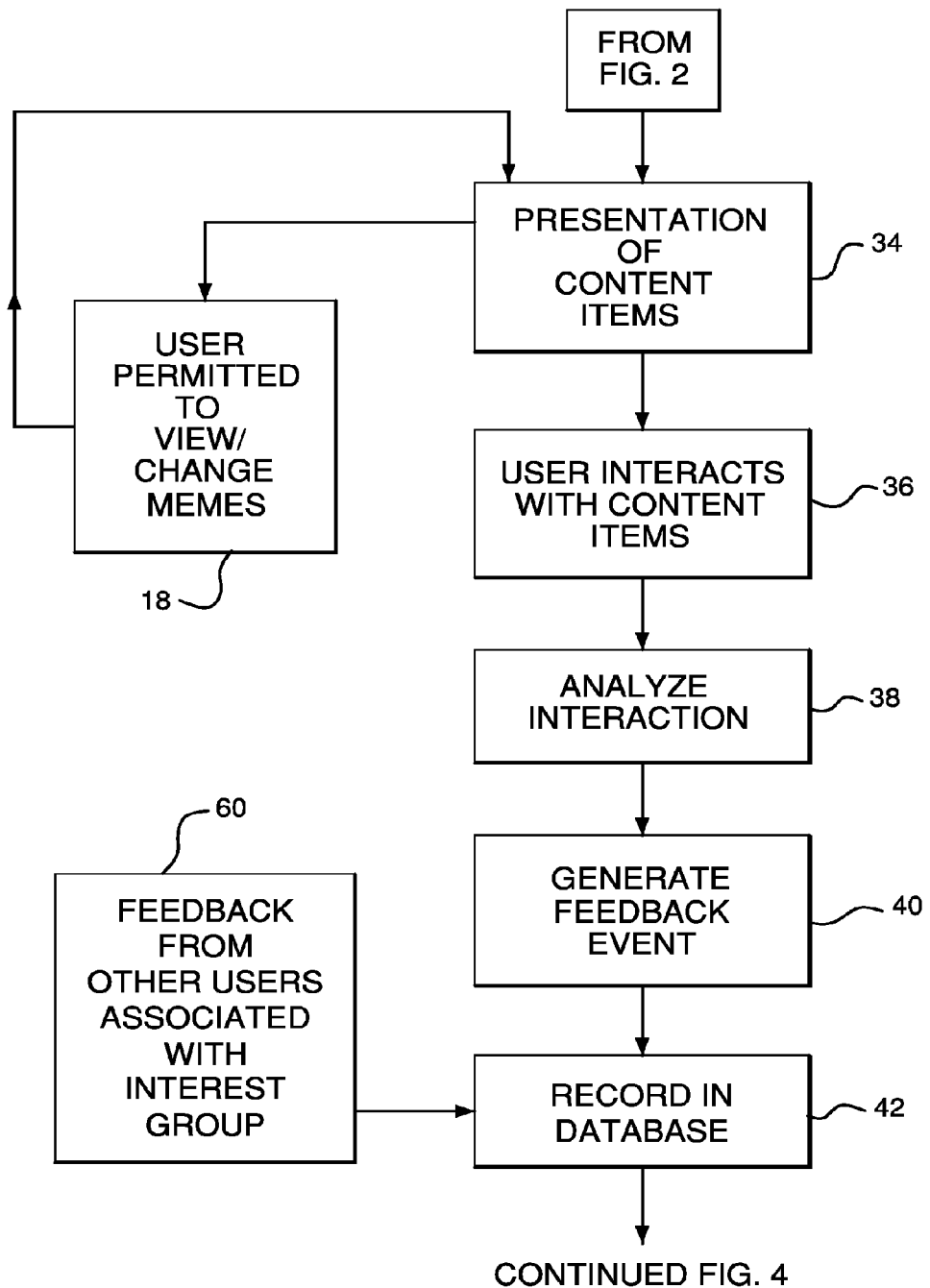
FIG. 3 is a block diagram of additional steps of the tool of FIG. 1.

Referring now to FIG. 3, once the user has been presented a particular set of content items as in subsystem 34, the user will typically interact with the content items as shown in subsystem 36. The user's interaction with those content items can be analyzed, as shown in subsystem 38, to infer which content items the user likes, dislikes, or is indifferent to. By extension, this information can be used to determine which characteristics of those content items, such as which tags or combinations of tags, are the best predictors of the user's liking or disliking particular items.

Each particular interaction by the user with a particular content item can be represented as a "feedback event" as shown in subsystem 40. Some feedback events may represent explicit actions that the user took on content items, while other feedback events are implicit in what the user may have done of might not have done during the interaction. In one form of the invention, the choice of which feedback events to define is driven by the user interface within which content items are being presented, and the actions afforded to the user on that content by that user interface.

For example, the tool 10 of the present invention can use the following examples feedback events:

A "read" feedback event indicates that the user took an explicit action to read the full content item (such as clicking on the item's hyperlinked title) after initially being presented with a title and summary or excerpt of the item.

A "preview" event indicates that the user took an explicit action to see a preview of the content item, such as a summary or excerpt of the item, after initially being presented with less information, such as only the title.

An "ignore" event indicates that the item was presented to the user, but that the user took no observable action on it.

A "like" event indicates that the user took an explicit action to indicate that they liked the content item, such as clicking on a "thumbs up" icon placed next to the item's title.

A "dislike" event indicates that the user took an explicit action to indicate that they disliked the content item.

A "share" event indicates that the user took an explicit action to share the content item as part of their profile, meaning that the content item would become a publicly visible part of the user's online persona.

A "recommend" event indicates that the user took an explicit action to recommend the content item to another user, such as by e-mailing it.

It should be understood that the above examples are merely exemplary and that many additional examples are contemplated by and fall within the scope of the present invention, and are known to those skilled in the art.

It is contemplated that each feedback event received from an individual user is recorded in a database as shown in subsystem 42 along with one or more of the following items of information:

The date and time when the feedback was received.

The user and meme set for which the feedback was received.

The document to which the feedback applies.

The type of feedback.

The "motivation" for the feedback, if this information was provided by the user.

With respect to motivation, depending on the user interface, if the user explicitly indicates that they like or dislike a content item, the user may be given an additional opportunity to explain his reason(s). For example, the user may indicate that he likes the item due to its source, due to its author, or due to its topic. Referring now to FIGS. 8 and 9, the user may indicate a dislike by clicking on the "thumbs down" icon 92, or alternatively by clicking on the hyperlinked title, to be brought to a feedback page 94 for providing additional information. This additional information can be used by the algorithms that automatically add, remove, and re-weight memes, as explained in greater detail below, to better interpret the particular feedback event.

The feedback history is a seriatim record of individual feedback events received by a user, in the context of a particular meme set. In order to be used by algorithms that add, remove, and re-weight memes, preferably automatically and as explained in greater detail below, the feedback history is converted to an "observation history" as shown in subsystem 44 of FIG. 4. The observation history summarizes the feedback by content item and motivation, and assigns a score and a weight to the overall feedback received for each item/motivation combination as shown in subsystem 46. With this feedback, memes are chosen as part of the meme set as shown in subsystem 48.

In one preferred embodiment of the present invention, an algorithm for summarizing the feedback history into an observation history is as follows:

An empty hash table that maps from an item/motivation combination to an observation is created.

For each feedback history event, the event's item/motivation combination is looked up in the hash table. If an observation has already been created for this item/motivation combination, this feedback history event is merged into that observation. Otherwise, a new observation is created.

Each resulting observation preferably has the following information:

A date and time, which may be the date and time of the last occurring feedback event that was merged into the observation.

The content item.

The motivation, if any.

A set of feedback event types representing the feedback events that were merged to create the observation.

In addition, on request, each observation should be preferably capable of computing the following information:

The observation's score in centiclicks. This represents the amount that the user is assumed to like or dislike a particular content item, given the feedback events that were received from the user and combined into the observation.

The observation's weight. This represents the strength of the evidence offered by the observation for the score. Observation weights are relative. For example in a preferred Java implementation of the present invention a weight of 1.0 to represent the strength of evidence offered by any "read" feedback event for the item.

The choice of how to assign a score and a weight to any particular combination of feedback events is discretionary and should be based on an understanding of the user interface within which the content items are presented. For example, one preferred algorithm comtemplated by the present invention for determining an observation score is as follows:

```
public static double getCenticlicks(Set<FeedbackEventType> feedback)
{
    if (feedback.contains(LIKE) || feedback.contains(SHARE)) {
        return 200;
    } else if (feedback.contains(READ)) {
        if (feedback.contains(DISLIKE)) {
            return -50.0;
        } else if (feedback.contains(RECOMMEND)) {
            return 150.0;
        } else {
            return 100.0;
        }
    } else {
        if (feedback.contains(DISLIKE)) {
            return -50.0;
        } else if (feedback.contains(IGNORE)) {
            return -10.0;
        } else if (feedback.contains(PREVIEW)) {
            return 10.0;
```

```
        } else if (feedback.contains(RECOMMEND)) {
            return 50.0;
        } else {
            return 0.0;
        }
    }
}
```

And, the following is one preferred algorithm in accordance with the present invention for determining an observation weight:

```
public static double getWeight(Set<FeedbackEventType> feedback)
{
    if (feedback.contains(SHARE)
        || feedback.contains(DISLIKE)
        || (feedback.contains(LIKE) && feedback.contains(READ))) {
        return 3.0;
    } else if (feedback.contains(READ)
               || feedback.contains(RECOMMEND)) {
        return 1.0;
    } else if (feedback.contains(IGNORE)
               || feedback.contains(PREVIEW)) {
        return 0.1;
    } else {
        return 0.0;
    }
}
```

It should be understood that the above examples are merely exemplary and that many additional examples are contemplated by and fall within the scope of the present invention, and are known to those skilled in the art.

In many cases, it is desirable for the system to be able to learn new memes for a user, or for a particular subject area for a user, rather than relying solely on predefined or preselected memes. In one preferred embodiment the observation history is used to construct a fitness function as shown in subsystem 52, which then allows the creation of new memes in subsystem 54 to be treated as an optimization problem.

Given an appropriate fitness function, there are a number optimization techniques that are suitable for generating new memes. For example, some suitable techniques include random sampling, hill climbing, an evolutionary algorithm such as a genetic algorithm, such as that described in Holland, J. H. *Adaptation in Natural and Artificial Systems*. MIT Press, Cambridge, Mass., 1992. Second edition (First edition, 1975), simulated annealing, such as that described in Kirpatrick S., C. D. Gelatt, M. P. Vecchi (1983) Optimization by simulated annealing. *Science*, 220:671-680, 1983, particle swarm optimization such as that described by Hu, X. and Eberhart R. Solving Constrained Nonlinear Optimization Problems with Particle Swarm Optimization. *6th World Multiconference on Systemics, Cybernetics and Informatics* (*SCI* 2002), Orlando, USA. These optimization techniques are well known to those skilled in the art of computer science. Other suitable optimization techniques are also known in the art and are contemplated by the present invention.

In one preferred embodiment of the present invention, new memes are created by constructing an appropriate fitness function from the observation history as shown in subsystem 52. For example, the fitness function may be preferably computed as follows:

In the observation history, a fraction of all observations that have positive scores, the fraction that have negative scores, and the fraction that have "strongly negative" scores are computed. The choice of threshold for any "strongly negative" score is a subjective decision. In one preferred form of the present invention, any observation that contains a "dislike" event is considered to be strongly negative.

For the particular meme being evaluated, the observations in the observation history that are matched by the meme are determined. A meme matches an observation if the meme matches the observation's document, and if either the meme has no associated motivations, the observation has no associated motivations, or the meme and the document have some motivations in common. The observations that are matched by a particular meme are referred to as the meme's "matching observations."

For each of the positive, negative, and strongly negative outcomes, the matching observations are counted with that outcome, and the outcome is compared with the fraction of all observations with that outcome. For example, the matching observations that are positive may be counted and outcome may be compare with the fraction of all observations that are positive.

For each of these three outcomes, the likelihood that the number of matching observations may have occurred by chance (called the "likelihood by chance for this outcome") is computed, given the fraction of all observations that had that outcome. The choice of probability model to compute this likelihood is a subjective decision. In one preferred form of the present invention, it is assumed that each observation in the observation history has an independent, equal, random chance of having each of the three outcomes. Therefore, the tool 10 computes a binomial distribution where the number of events is equal to the number of matching observations, and the probability that each event has the outcome under consideration (such as a positive outcome) is equal to the fraction of observations in the observation history having that outcome. The likelihood that the number of matching observations have the outcome under consideration by chance is then a sum of the probabilities under the binomial distribution. This sum is taken over the portion of the distribution that covers all cases where at least as many of the matching observations have this outcome as were actually counted.

The minimum of the likelihoods by chance for the three outcomes is computed. This computation is referred to as "likelihood by chance" for the meme overall because it represents the likelihood that the most extreme observed performance of the meme could have been purely chance.

If desired, also an "overfit risk" for the meme may be calculated. The overfit risk represents the danger that this particular meme's performance was caused by overfitting the meme's own internal complexity to the available observations, instead of actually capturing real information about the observations. This step is optional, and it is a subjective decision regarding how to compute the overfit risk. For example, the overfit risk could be based on the meme's complexity, based on a static analysis of the meme, or based on the meme's performance for other users across the system, or the like.

Preferably the meme's fitness is computed in such a way that a reduced likelihood by chance drives a higher fitness, and a reduced overfit risk drives a higher fitness. It is a subjective decision regarding how exactly to compute this fitness; in one preferred embodiment of the present invention the computation is performed by the following Java code:

```
double estimatedOverfitRisk =
meme.getEstimatedOverfitRisk( );
    double estimatedOverfitResiliance =
Math.max(1.0, Math.min(10.0, 11.0 -
estimatedOverfitRisk));
    double likelihoodItWasChance =
getLikelihoodResultsByChance( );
    return 0.1 * estimatedOverfitResiliance *
Math.pow(Math.log10(likelihoodItWasChance), 2.0);
```

The present invention has described two preferred sources for memes for a particular user or subject area, i.e., memes may come from the user setup process, including the association of the user with one or more interest groups, or new memes can be discovered by an optimization technique.

Other sources of candidate memes are also contemplated by the present invention as shown in subsystem 56. The following are some suitable sources thereof:

The top memes, i.e., the highest-weighted memes from the user's direct contacts in a social network. The effect of this approach is to allow memes to spread from user to user across the social network.

The memes that are most common or have the highest average weight in the system overall. The effect of this approach is to allow successful memes to propagate across the entire system.

The memes that are most common or have the highest average weight across other users with some particular similarity to this one. For example, candidate memes could be drawn from the memes sets of users in the same geographic area, or with the same expressed set of interests, or having meme sets that are similar by some metric. The effect of this approach is to allow successful memes to propagate from one user to another user that is in some sense similar.

It should be understood that the above examples are merely exemplary and that many additional examples are contemplated by and fall within the scope of the present invention, and are known to those skilled in the art.

Figure 5:
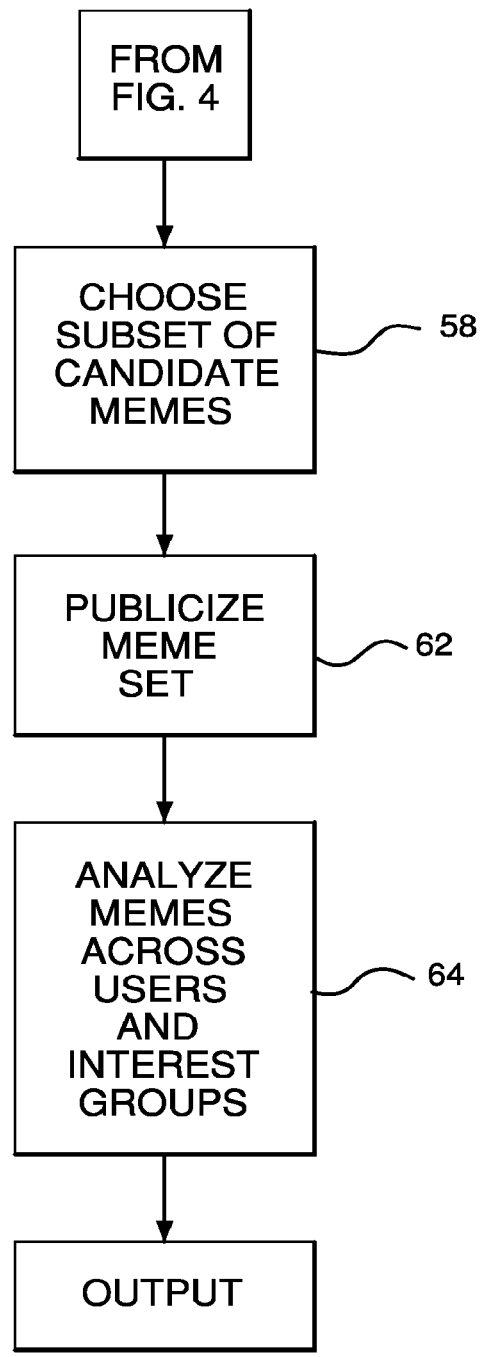
FIG. 5 is a block diagram of additional steps of the tool of FIG. 1.

Given a set of candidate memes, and the observation history associated with the meme set, i.e., with a user or with a specific subject area for a user, it is necessary to choose the memes that should now be part of the meme set a shown in subsystem 58 of FIG. 5. This can be accomplished by use of the following preferred algorithm:

Each meme that is currently in the meme set is added to the set of candidate memes.

Optionally, each candidate meme may be given an opportunity to propose simplifications of itself, which should be added as additional candidates. For example, if one of the candidate memes is a "both content tags" meme that matches documents containing both the phrase "football" and the phrase "NFL," that candidate meme might propose two simplifications: a "content tag recognizer" meme that matches documents containing the phrase "football," and a "content tag recognizer" meme that matches documents containing the phrase "NFL." In a preferred Java implementation in accordance with the present invention, this step is performed by implementing each meme as a Java object, and by providing a Java method that the meme can implement to propose simplifications of itself. The purpose of this step is to make certain that the system does not use a complex reason for presenting content when a simple reason would do just as well.

The candidate memes are sorted by descending fitness, where the fitness is calculated as explained previously in this application.

The meme set is temporarily emptied.

In order by descending fitness, each candidate meme is considered for inclusion into the meme set as follows:

If the user has previously indicated that the meme should always be used, as described in greater detail below, then the meme is added to the meme set.

If the user has previously indicated that the meme should not be used, as explained in greater detail below, then the meme is discarded.

Optionally, the meme's fitness is compared with a pre-defined threshold to determine if the meme should be considered statistically significant. If not, then the meme may be discarded.

If the meme is identical to one already included in the meme set, then the meme may be discarded.

Optionally, if the meme is too similar structurally to a meme already included in the meme set, then the meme may be discarded. This step is useful to avoid including memes that will be confusingly similar from a users point of view. It is a subjective decision regarding how to evaluate whether two memes are too similar to both be included. In a preferred Java implementation of the present invention, the present invention includes a Java interface for querying memes already included in the meme set as to whether the memes consider a particular candidate meme to be too similar to themselves.

If the meme's behavior is too similar to one already included in the meme set, then the meme may be discarded. It is a subjective decision regarding how to measure behavioral similarity. In a preferred Java implementation of the present invention, the present invention measures behavioral similarity by the ratio of the number of observations in the observation history matched by both candidate memes divided by the number of observations matched by either candidate meme. In other words, it is the size of the intersection of the two memes' matching observations divided by the size of the union of the two memes' matching observations.

If the candidate meme passes all of the above hurdles, then it is added to the meme set, and the process continues with the next candidate meme.

It should be understood that the above examples are merely exemplary and that many additional examples are contemplated by and fall within the scope of the present invention, and are known to those skilled in the art.

Figure 4:
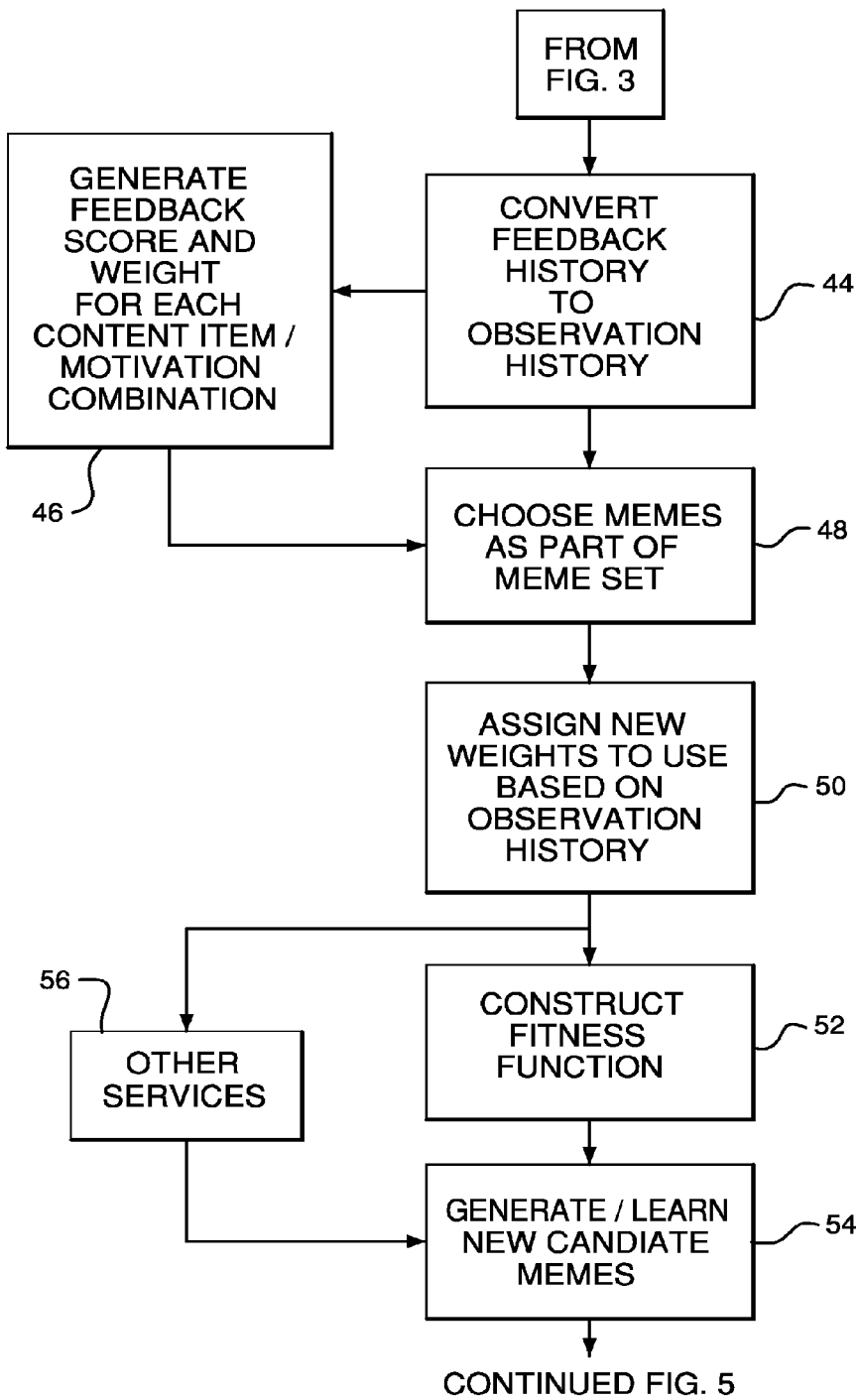
FIG. 4 is a block diagram of additional steps of the tool of FIG. 1.

Given a meme set and an observation history, it may be desirable to use the observation history to assign new weights to the memes in the meme set a shown in subsystem 50 of FIG. 4. The goal is to assign meme weights that maximize the meme set's accuracy in forecasting the percent likelihood that the user will like future content items. This forecasting process is described in greater detail below.

A simple approach that might work reasonably well for some applications is to apply a standard optimization algorithm, such as that described in "Relevance Feedback in Information Retrieval," In G. Salton (ed), "The SMART Retrieval System. Prentice-Hall, pp. 313-323; logistic regression; or simple hill climbing. However, because the meme set may contain a large number of memes, and because some of the memes may have been found by an optimization process that examined an even larger number of memes, there is considerable risk of overfitting the meme weights to noise in the historical feedback data, instead of successfully finding the meme weights that provide the best forecast of future feedback.

There are other difficulties with merely applying a standard optimization algorithm. One is that the user's stated preferences, as explained in greater detail below, must be taken into account. Another difficulty is that, until a considerable number of observations have been accumulated for the individual user, the initial weights assigned to memes through the setup process, as explained in greater detail below, may provide better forecasts than new meme weights chosen based on the observation history.

To overcome these difficulties, in one preferred form the invention contemplates the use of a simple hill climbing algorithm but enforces the following constraints:

If the user has explicitly indicated that a certain meme should be interpreted positively or negatively, as described in greater detail below, that information is used to establish a minimum weight and a maximum weight for the meme.

If the meme was given an initial weight during the setup process, and if the observations matched by the meme have a total weight less than a preset threshold, then the meme is held at its initial weight.

If the user has not explicitly indicated how the meme should be interpreted, and if the meme either did not have an initial weight, or has passed the preset threshold on total observation weight, than the minimum weight and maximum weight for the meme are set by formulas driven by the memes' statistical significance according to their matching observations. It is a subject decision regarding how to set these weights. In one preferred embodiment, the present invention uses the following Java code to set them:

```
double MAX_NEGATIVE_WEIGHT_MULTIPLIER = 0.1;
double MAX_POSITIVE_WEIGHT_MULTIPLIER = 0.8;
double estimatedOverfitRisk =
meme.getEstimatedOverfitRisk( );
  double estimatedOverfitResiliance =
Math.max(1.0, Math.min(10.0, 11.0 -
estimatedOverfitRisk));
  double minWeight =
MAX_NEGATIVE_WEIGHT_MULTIPLIER
      *
estimatedOverfitResiliance
      *
Math.pow(Math.log10(likelihoodSoNegative), 2.0);
  double maxWeight =
MAX_POSITIVE_WEIGHT_MULTIPLIER
      *
estimatedOverfitResiliance
      *
Math.pow(Math.log10(likelihoodSoPositive), 2.0);
```

Figure 11:
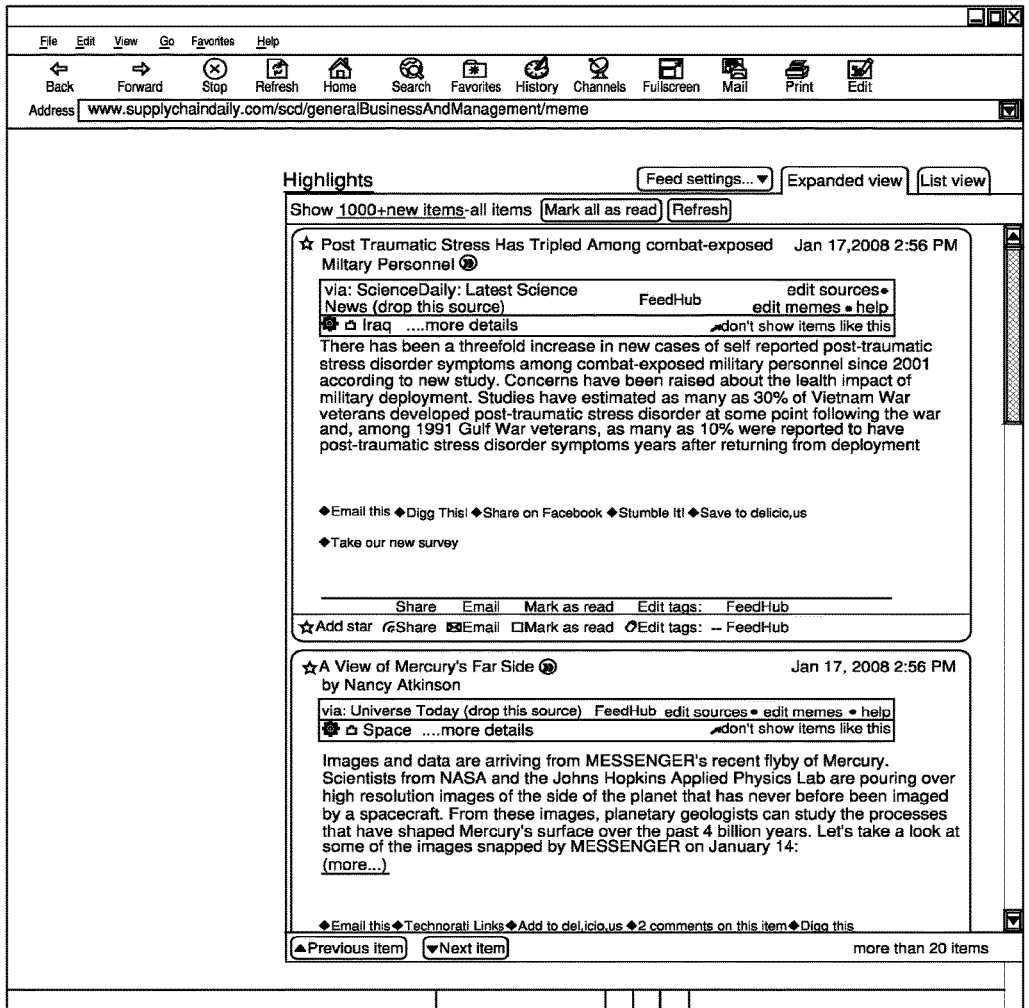
FIG. 11 is a screenshot displayed by the tool of FIG. 1 showing a user interface for editing meme weight in accordance with various embodiments of the present invention.

To deliver the most desirable content and to get the optimal user experience, the user should be allowed to see his memes, to change weights of the memes (directly or indirectly), to create new memes, and to delete memes as shown in subsystem 18 of FIG. 3 and in the screenshots shown in FIG. 11. Such functionality includes the following steps:

Each meme should have one or several representations that the user can readily understand. In one preferred Java implementation of the present invention, the system implements each meme as a Java object, with methods for generating a textual short description, long description, and the like.

The memes in a meme set should be displayed in a way that conveys to the user the relative weights of the memes, including whether the weights are positive or negative. This can be done in several ways: an explicit label next to a meme can indicate the category that the meme weight falls into, such as "strongly positive," "positive," "neutral," "negative," or "strongly negative." An explicit label may indicate the effect of the meme on the user's content, such as "always show me content like this," or "usually show me content like this." A user interface control, such as a slider may be placed next to the meme to show the meme's weight; the representation of the meme may be placed along a horizontal vertical axis to indicate the meme's weight (such as at top of the scale for a strongly positive meme near the middle of the scale for a neutral name, and the like) (See FIG. 11). The memes may be listed in categories, where each category corresponds to a range of meme weights. The meme weight can be represented by how far a meme is from the center of a cluster of memes. The meme weight may be represented by font size or font color. The meme weight may be represented by an icon. Lastly, one or more combination of these approaches may be used.

Optionally, it may be beneficial to display different types of memes separately. In one form of the invention, the system divides memes by "motivation" as described above.

The user should be given a way to directly or indirectly change the relative weights of the memes. Ideally, this should be done by allowing the user to directly manipulate the same representation that is used to display the weights of the memes. For example, if an explicit label is used to indicate the weight category, the category label can be placed in a pulldown menu so that the user can change it; if a user interface widget such as a slider is used to represent the weight, the user may be allowed to interact with that widget; if the meme is placed along the horizontal or vertical axis to indicate its weight, the user may be allowed to drag it along that axis; if the meme is listed in a category to indicate its weight, the user may be permitted to drag it to a different category; if the meme weight is represented by the distance of the meme from the center of a cluster, the user may be allowed to drag the meme closer or further from the center; or the like.

Because the user will not typically be able to understand the exact meaning of a particular exact meme weight, it is generally better to interpret the user's input as establishing a range of possible weights (a minimum weight and a maximum weight) for a meme, rather than establishing a single specific weight. The meme's precise weight can then be determined as described above.

Optionally, multiple memes may be combined into a single representation for presentation to the user. For example, multiple memes with "source" motivation may be combined into a single description or visualization of sources that the user likes.

The user must be given a way to delete a meme. This should do more than just delete the meme from the meme set, because otherwise the process described above might simply add the meme back at any time. The present invention addresses this issue by keeping the meme in the meme set but marking it "do not use," which forces its weight to stay at zero.

Optionally, it might be beneficial to provide the user with a way to review which memes they have deleted and "undelete" one.

The user should also be given a way to create a new meme. This may be done by allowing the user to choose from a list or palette of basic meme types, such as those described above, and then allowing them to fill in the blanks to parameterize the meme they have created, such as by entering in the keyword for a keyword meme).

Figure 12:
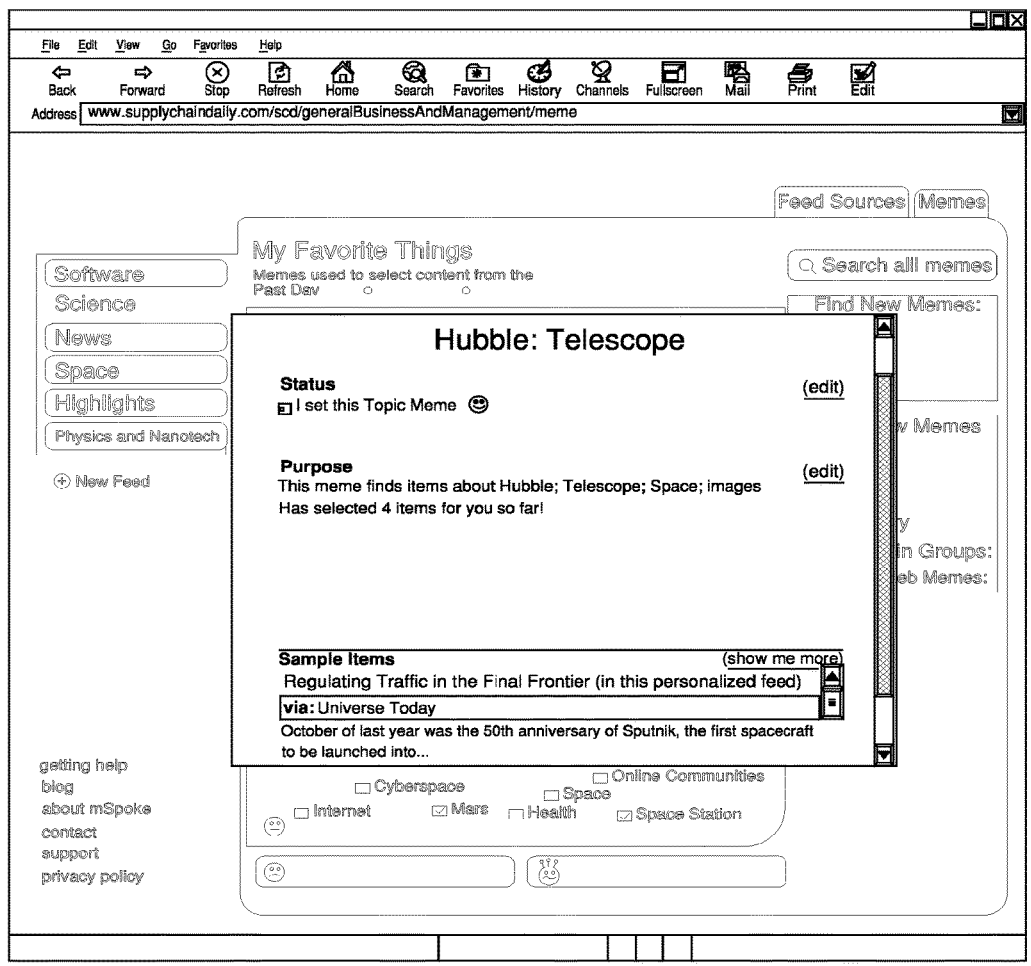
FIG. 12 is a screenshot displayed by the tool of FIG. 1 showing a meme presentation to a user in accordance with various embodiments of the present invention.
Figure 13:
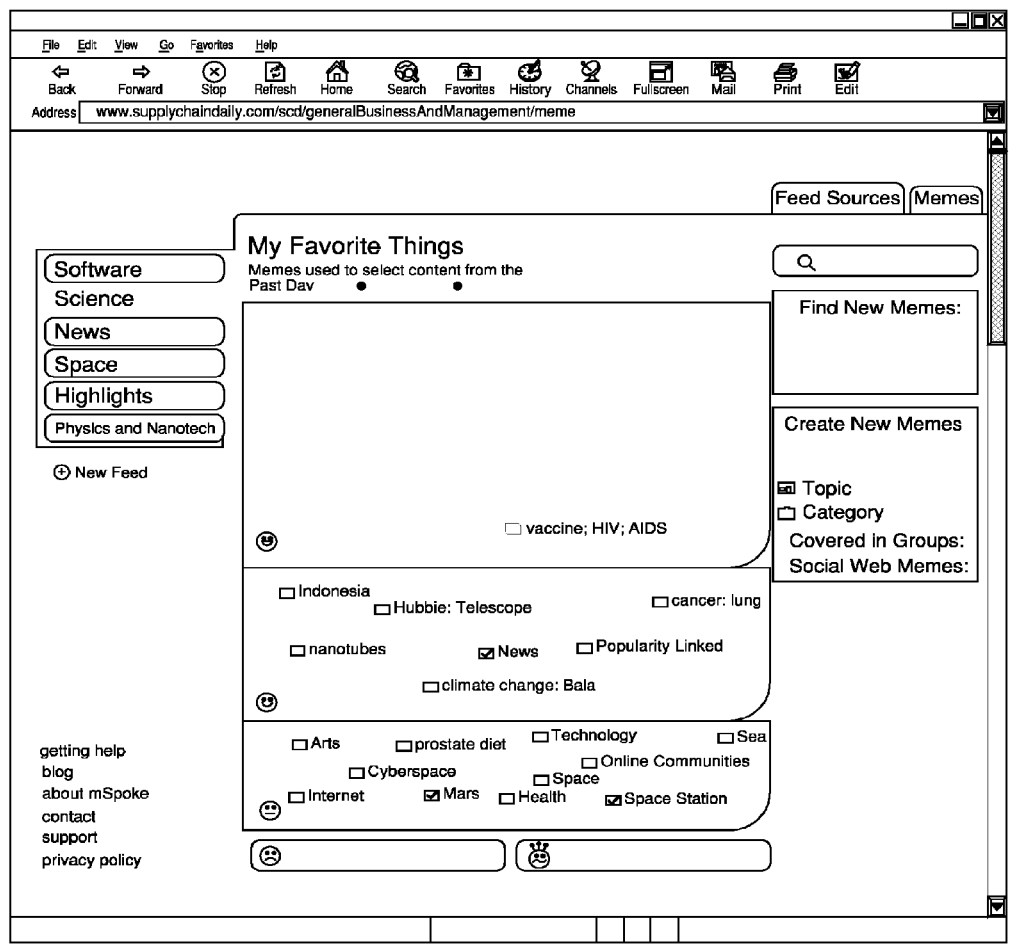
FIG. 13 is a screenshot displayed by the tool of FIG. 1 showing an alternative user interface for editing memes in accordance with various embodiments of the present invention.

Referring now to FIGS. 12 and 13, the user may also be given a way to view and change all of their memes or the memes from a particular meme set, which may be presented to the user as a subject area, a section of content, an RSS feed, or the like. Alternatively or additionally, they may be given a way to ask why they were shown a particular content item, in which case they would be shown only the memes that matched that content item. Alternatively or additionally, the user may be shown memes from any or all of the interest groups with which they are associated.

If users are associated with interest groups as described in connection with subsystem 14, then feedback from multiple users belonging to the same interest group may be aggregated, and this "group feedback history" may be used to generate a meme set for the interest group as shown in subsystem 60 of FIG. 3. The content that is found and filtered by an interest group's meme set may be blended with the content that is found and filtered by meme sets for individual users.

The procedure for aggregating feedback events across members of an interest group is very similar to the process described in connection with subsystem 44 of FIG. 4, but with one modification: each observation for an interest group includes a count of the number of feedback events of each type received from the group. For example, the observation for a particular content item for an interest group includes a count of the number of group members, i.e., individual users associated with the group, that read that content item.

The procedure for creating new memes given the observation history for an interest group is very similar to the process described in connection with the procedure for learning new memes for a user based on the user's observation history described above, but with the following modifications:

Because each observation contains counts for each type of event, different algorithms should be used for assigning a score and weight to the observation.

A different fitness function should be used for evaluating a meme based on its matching observations.

Different functions must be used for determining a meme's "minimum weight" and "maximum weight" given its matching observations.

To assign a weight to an observation for an interest group, the present invention adds the total weights for all individual events aggregated into that observation. For example, if an "ignore" event has a weight of 0.1, and a "read" event has a weight of 1.0, and if a particular observation has 10 'ignore" events and a single "read" event, then the weight assigned to that observation is 2.1.

To assign a score to an observation for an interest group, the present invention takes the weighted average of the scores associated with the individual events aggregated into that observation. For example, using the same weights for "ignore" and "read" events as described in the previous paragraph, if the score associated with an "ignore" event is −10, and the score associated with an "read" event is 100, and if we again assume an observation with 10 "ignore" events and a single "read" event, the resulting score for the observation is:

$$(-10*0.1*10+100*1.0*1)/(10*0.1+1*1.0)=90/2.0=45.$$

The choice of assumptions used for the fitness function is a subjective decision. The system of the present invention assumes that the mean scores for sets (having the same size as the meme's set of matching observations) of observations randomly chosen from the observation history will have approximately a normal distribution, with a standard deviation that can be approximated by taking the standard deviation of the scores of the memes matching observations and dividing it by the square root of the number of matching observations.

Given those assumptions, and given a defined confidence interval expressed in standard deviations, the present invention engine uses the mean score of the meme's matching observations, combined with the approximation calculated above for the standard deviation of that mean, to compute a "limiting weight." This is the value closest to zero, within the confidence interval, of the limit of the mean for the meme's matching observations if the sample size were increased without bound.

In one preferred embodiment, the Java code used for this calculation in the present invention is as follows:

```
double sampleMean = computeAverageScore(memeObservations);
double sampleStdev = computeStdev(memeObservations);
double estimatedStdevOfSampleMean = sampleStdev / Math.sqrt(memeObservations.size( ));
double expectedWeight = sampleMean − globalAverageScore;
double minWeight = expectedWeight − CONFIDENCE_INTERVAL_WIDTH_STDEVS * estimatedStdevOfSampleMean;
double maxWeight ; expectedWeight + CONFIDENCE_INTERVAL_WIDTH_STDEVS * estimatedStdevOfSampleMean;
double limitingWeight;
if (minWeight > 0.0) {
    limitingWeight = minWeight;
} else if (maxWeight < 0.0) {
    limitingWeight = maxWeight;
} else {
    limitingWeight = 0.0;
}
```

The absolute value of this limiting weight is used as the meme's fitness. If the limiting weight is negative, then it is taken to be the meme's minimum fitness, and zero is taken to be the meme's maximum fitness. If the limiting weight is positive, then zero is taken to be the memes minimum fitness and limiting weight is taken to be the memes maximum fitness.

The methods described so far in connection with the preferred embodiments result in meme sets that represent sources of content that is intelligently found and filtered for individual users and interest groups. These users and groups may have various reasons for wanting to publicize and promote the sources of content as how in subsystem 62. For example, the users and groups may desire to be viewed as an expert on a particular subject, may desire some financial reward, or may need to carry out the job functions such as training or educating a certain group of people.

Also, the operator of the overall system may have various reasons for wanting to publicize and promote certain meme sets as sources of content, such as to help new users get started with the system more easily or to make the system more appealing.

To support these goals, the system may optionally include some or all of the following features:

A way for the user or group who owns a meme set (the "meme set owner") to control who has access to a particular meme set, or to content from particular meme set.

A way for the meme set owner to name and describe the meme set.

A way for the meme set owner to publicize the meme set, such as by making it available to searches, or by placing it in the public directory.

A way for the meme set owner to control whose feedback will affect the content of a meme set.

It should be understood that the above examples are merely exemplary and that many additional examples are contemplated by and fall within the scope of the present invention, and are known to those skilled in the art.

When all of the meme sets for individual users and interest groups are considered in the aggregate as shown in subsystem 64, they contain information that may be valuable in better understanding the overall content preferences of those users and groups. This information might be presented in an analytical interface, for example, for use by the publishers of a website to improve their content, or to improve their advertising.

The particular embodiments described herein are provided by way of example and are not meant in any way to limit the scope of the claimed invention. It is understood that the invention is not limited to the disclosed embodiments, but on the contrary, is intended to cover various modifications and equivalent arrangements included within the spirit and scope of the appended claims. Without further elaboration, the foregoing will so fully illustrate the invention, that others may by current or future knowledge, readily adapt the same for use under the various conditions of service.

What is claimed is:

1. A method, comprising:
   creating a plurality of content selection rules for a user to find content items;
   generating a content selection algorithm based on the plurality of content selection rules to determine which content items to present to the user, the generating of the content selection algorithm including assigning an initial weight to each content selection rule of the plurality of content selection rules, each respective initial weight determining a contribution of the corresponding content selection rule in determining which content items to present to the user;
   identifying multiple content items using the content selection algorithm;
   filtering the identified multiple content items using one or more of the plurality of content selection rules associated with the user;
   selecting one or more content items using the content selection algorithm based on the filtering of the identified content items;
   presenting the one or more content items to the user;
   monitoring user interactions with the one or more content items presented to the user; and
   modifying the content selection algorithm according to a fitness function generated from one or more user interactions with the one or more content items presented to the user, the modifying of the content selection algorithm further including at least one of:
   adding one or more new content selection rules to the content selection algorithm based on fitness data from the fitness function; and
   removing one or more of the plurality of content selection rules from the content selection algorithm based on fitness data from the fitness function.

2. The method of claim 1, wherein the modifying of the content selection algorithm includes assigning a new weight to at least one content selection rule of the plurality of content selection rules.

3. The method of claim 1, further comprising:
   learning the one or more new content selection rules that should be added to the content selection algorithm based on the one or more user interactions with the one or more content items presented to the user;
   determining the one or more selection rules to be removed from the content selection algorithm based on the one or more user interactions with the one or more content items presented to the user; and
   adjusting parameters that influence how the selection rules are weighted in the content selection algorithm based on the one or more user interactions with the one or more content items presented to the user.

4. The method of claim 2, further comprising selecting an additional content item using the modified content selection algorithm.

5. The method of claim 1, wherein filtering the identified content items includes:
   scoring each of the identified multiple content items based on one or more of the content selection rules; and
   sorting the identified multiple content items into a list based on a score assigned to each of the identified multiple content items; wherein accessing a content item using the content selection algorithm includes accessing the identified multiple content items at a top of the list.

6. The method of claim 1, wherein the user is part of a group of users, the plurality of selection rules are created for the group, the content selection algorithm is generated for the group, and interaction of the group with respect to the first content item is monitored to determine the modification of the content selection algorithm based on interaction by the group.

7. The method of claim 6, wherein the content selection algorithm of at least one user is influenced by the content selection algorithm generated for the group.

8. The method of claim 1, further comprising adjusting the at least one content selection rule based on selection rules of other users.

9. The method of claim 1, wherein a plurality of content selection algorithms are generated for the user based on the content selection rules.

10. The method of claim 1, wherein the first content item includes advertising content.

11. A non-transitory machine-readable storage medium comprising instructions that, when executed by one or more processors of a machine, cause the machine to perform operations comprising:
   creating a plurality of content selection rules for a user to find content items;
   generating a content selection algorithm based on the plurality of content selection rules to determine which content items to present to the user, the generating of the content selection algorithm including assigning an initial weight to each content selection rule of the plurality of content selection rules, each respective initial weight determining a contribution of the corresponding content selection rule in determining which content items to present to the user;

identifying multiple content items using the content selection algorithm;
filtering the identified content items using one or more of the plurality of content selection rules associated with the user;
selecting one or more content items using the content selection algorithm based on the filtering of the identified content items;
presenting the one or more content items to the user;
monitoring user interactions with the one or more content items presented to the user; and
modifying the content selection algorithm according to a fitness function generated from one or more user interactions with the one or more content items presented to the user, the modifying of the content selection algorithm further including at least one of:
adding one or more new content selection rules to the content selection algorithm based on fitness data from the fitness function; and
removing one or more of the plurality of content selection rules from the content selection algorithm based on the fitness data from the fitness function.

12. The non-transitory machine-readable storage medium of claim 11, wherein the modifying of the content selection algorithm includes assigning a new weight to at least one content selection rule of the plurality of content selection rules.

13. The non-transitory machine-readable storage medium of claim 11, further comprising:
learning the one or more new content selection rules that should be added to the content selection algorithm based on the one or more user interactions with the one or more content items presented to the user;
determining the one or more content selection rules to be removed from the content selection algorithm based on the one or more user interactions with the one or more content items presented to the user; and
adjusting parameters that influence how the content selection rules are weighted in the content selection algorithm based on the one or more user interactions with the one or more content items presented to the user.

14. The non-transitory machine-readable storage medium of claim 12, wherein the operations further comprise selecting an additional content item using the modified content selection algorithm.

15. The non-transitory machine-readable storage medium of claim wherein filtering the identified content items includes:
scoring each of the identified multiple content items based on one or more of the content selection rules; and
sorting the identified multiple content items into a list based on a score assigned to each of the identified multiple content items; wherein accessing a content item using the content selection algorithm includes accessing the identified multiple content items at a top of the list.

16. The non-transitory machine-readable storage medium of claim 11, wherein the user is part of a group of users, the plurality of content selection rules are created for the group, the content selection algorithm is generated for the group, and interaction of the group with respect to the first content item is monitored to determine modification of the content selection algorithm based on interaction by the group.

17. The non-transitory machine-readable storage medium of claim 16, wherein the content selection algorithm of at least one user is influenced by the content selection algorithm generated for the group.

18. The non-transitory machine-readable storage medium of claim 11, wherein the operations further comprise adjusting the at least one content selection rule based on selection rules of other users.

19. The non-transitory machine-readable storage medium of claim 11, wherein the content selection algorithm identifies the multiple content items from a pre-selected stream of candidate items.

20. A system comprising:
at least one processor of a machine; and
a machine-readable storage medium storing instructions that configure the at least one processor of the machine to perform operations comprising:
creating a plurality of content selection rules for a user to find content items;
generating a content selection algorithm based on the plurality of content selection rules to determine which content items to present to the user, the generating of the content selection algorithm including assigning an initial weight to each content selection rule of the plurality of content selection rules, each respective initial weight determining a contribution of the corresponding content selection rule in determining which content items to present to the user;
identifying multiple content items using the content selection algorithm;
filtering the identified content items using one or more of the plurality of content selection rules associated with the user;
selecting one or more content items using the content selection algorithm based on the filtering of the identified content items;
presenting the one or more content items to the user;
monitoring user interactions with the one or more content items presented to the user; and
modifying the content selection algorithm according to a fitness function generated from one or more user interactions with the one or more content items presented to the user, the modifying of the content selection algorithm further including at least one of:
adding one or more new content selection rules to the content selection algorithm based on fitness data from the fitness function; and
removing one or more of the plurality of content selection rules from the content selection algorithm based on the fitness data from the fitness function.

* * * * *

UNITED STATES PATENT AND TRADEMARK OFFICE
CERTIFICATE OF CORRECTION

| | | |
|---|---|---|
| PATENT NO. | : 9,703,877 B2 | Page 1 of 1 |
| APPLICATION NO. | : 14/921654 | |
| DATED | : July 11, 2017 | |
| INVENTOR(S) | : Mawhinney et al. | |

It is certified that error appears in the above-identified patent and that said Letters Patent is hereby corrected as shown below:

In the Claims

In Column 26, Line 31, in Claim 5, after "items;", insert --¶--

In Column 27, Line 47, in Claim 15, delete "claim" and insert --claim 11,-- therefor In Column 27, Line 53, in Claim 15, after "items;", insert --¶--

Signed and Sealed this
Tenth Day of April, 2018

Andrei Iancu
*Director of the United States Patent and Trademark Office*